US007482568B2

(12) United States Patent
Troitski

(10) Patent No.: US 7,482,568 B2
(45) Date of Patent: Jan. 27, 2009

(54) LASER-COMPUTER GRAPHICS SYSTEM FOR GENERATING PORTRAIT AND 3-D SCULPTURE REPRODUCTIONS INSIDE OPTICALLY TRANSPARENT MATERIAL

(75) Inventor: Igor Troitski, Henderson, NV (US)

(73) Assignee: Troitski, Henderson, NV (US)

( * ) Notice: Subject to any disclaimer, the term of this patent is extended or adjusted under 35 U.S.C. 154(b) by 1372 days.

(21) Appl. No.: 10/260,012

(22) Filed: Oct. 31, 2002

(65) Prior Publication Data

US 2005/0051522 A1   Mar. 10, 2005

Related U.S. Application Data

(62) Division of application No. 09/354,236, filed on Jul. 16, 1999, now Pat. No. 6,605,797.

(51) Int. Cl.
*H01L 27/00* (2006.01)
(52) U.S. Cl. ............................... 250/208.1; 250/559.02
(58) Field of Classification Search ............. 250/208.1, 250/559.02; 219/121.67, 121.68, 121.69, 219/121.73, 121.75; 382/141–151
See application file for complete search history.

(56) References Cited

U.S. PATENT DOCUMENTS 6,614,429 B1 *   9/2003   Zhang et al. ................ 345/420

* cited by examiner

*Primary Examiner*—Que T. Le

(57) ABSTRACT

Embodiments of methods and laser-computer graphics systems for producing images such as portraits and 3-D sculptures formed from laser light created etch points inside an optically transparent material are disclosed. One or more embodiments of the invention comprise a method and system for simultaneously producing one or more etch points in first and second objects. In accordance with a method, a main beam is split into first and second beams, each beam having an energy level greater than that necessary to cause a breakdown in the material comprising the first and second objects. The first and second beams are directed at focal points within the first and second objects, generating etch points simultaneously therein. One or more embodiments of the invention comprise methods and systems for generating images in first and second objects. In one or more embodiments, the images are comprised of etch points having multiple gray shades and/or of etch points having iridescent qualities.

7 Claims, 18 Drawing Sheets a)

b)

a)

b)

LASER-COMPUTER GRAPHICS SYSTEM FOR GENERATING PORTRAIT AND 3-D SCULPTURE REPRODUCTIONS INSIDE OPTICALLY TRANSPARENT MATERIAL

This application is a divisional of application Ser. No. 09/354,236 filed on Jul. 16, 1999, now U.S. Pat. No. 6,605, 797.

FIELD OF THE INVENTION

The present invention relates to a method and apparatus for producing an image inside a transparent object, and more particularly, to methods and systems using laser energy for producing an image in a material.

BACKGROUND OF THE INVENTION

A number of techniques for creating a variety of patterns on the surface and inside of transparent substrates using pulsed laser radiation are well known.

One publication disclosing such techniques is the Russian invention document #321422 to Agadjanov et al., published on Nov. 16, 1970 (#140454529-33). The disclosed invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different sizes arranged randomly around the focal point of the optical system guiding a laser beam. The device used to carry out this technique is preferably a multi-mode solid-state, free-running pulse laser used in conjunction with a convergent lens having a focal length from 100 to 200 mm.

U.S. Pat. No. 4,843,207 to Urbanek et al. discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

True interior laser-etching of a transparent article is described in U.S. Pat. No. 5,206,496 to Clement et al. This patent discloses a method and apparatus for providing in a transparent material, such as glass or plastic, a mark which is visible to the naked eye or which may be "seen" by optical instruments operating at an appropriate wavelength. The Clement et al. patent describes a method and apparatus for producing a subsurface marking which is produced in a body such as bottle by directing into the body a high energy beam and bringing the beam to focus at a location spaced from the surface, so as to cause localized ionization of the material. In the preferred embodiment the apparatus includes a laser as the high energy beam source. The laser may be a N-YAG laser that emits a pulsed beam of laser radiation with a wavelength of 1.06 microns. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 nm. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

European Patent Application No. 624421A2 to Erokhin (priority based upon U.S. patent application Ser. No. 08/110, 048 and Russian Patent Application No. 29023) discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material.

In the prior art arrangements, neither the characteristics of the transparent material or physical phenomenon of laser-matter interaction are taken into consideration. As a result, the distance between image etch point elements is selected with no consideration for the material strength. Therefore, the article may be damaged if the elements are too close to each other. On the other hand, the image resolution may be unacceptably low if the elements are too far from each other.

The first computer graphic system for producing an image inside optically transparent material which takes into account the characteristics of the transparent material is described in U.S. patent application Ser. No. 08/643,918 to Troitski et al. An image reproducible inside optically transparent material is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

Images comprising laser-generated etch points produced by all known systems and methods generally suffer from having a lower resolution than the real image (such as a picture) or the computer processing image from which it is derived. As such, some of the details of the original image are lost. It is known that the number of pixels covering the area of the image determines the resolution of the computer image. On the other hand, the resolution of the reproducible image is determined by the number of its etch points. A value "d" comprises a minimum distance between adjacent etch points in optically transparent material for a selected energy of laser radiation which avoids an internal split or other undesirable damage or weakening of the material. Therefore, such a system should produce adjacent etch points in the same plane separated by a distance greater than d, as described in U.S. patent application Ser. No. 08/643,918 to Troitski et al.

An image reproduced in an object may be derived from a computer-generated image of the object. Adjacent pixels of a computer processing image touch each other. Not all pixels, but only part of them (usually less than ¼ of their number), can be corresponding etch points in reproducible image if one is to avoid their being spaced closer than distance d. On the other hand, the greater the number of pixels which are lost, the lower the resolution of the reproduced image in comparison to the computer image.

Another problem is that for typical values of d, a viewer of the-object may discern the individual etch points formed in the material. As a result, an image reproducible in optically transparent material comprising widely spaced etch points appears rough visual to the naked eye (see FIG. 2). This roughness is generally undesirable, and may be unacceptable for portrait and similar images requiring high resolution.

The inability to transform all image pixels into etch points in material has a profound effect on the quality of a reproduced image, such as a portrait. In addition, however, any inexact transformation of gray shades can also make a significant difference in quality of the produced image. One method of transforming the gray shades of a displayed image into gray shades of an image reproduced inside of material, using corresponding sizes of etch points created by adjusting the laser radiation power, has been described in European Patent Application No. 624421 A2 to Erokhin. The disclosed method permits only the reproduction of a "half-tone picture" with considerable fluctuation in the appearance of the gray shades. This is due in part to the face that there is considerable fluctuation in the appearance of etch points produced by even the same laser energy. Consequently, to produce a portrait or other image with high quality it is very important to produce etch points with the same shape. In order for the etch points to have a high brightness, it is desirable for the etch points to have the shape of a sphere.

Further, the number of points required to produce a portrait with a required level of detail increases when producing a 3-D image. For instance, FIG. 2 shows a portrait of Abraham Lincoln which has 5 times as many points than the 3-D image of the Lincoln Memorial, shown in the same figure.

Another problem is that it is often desirable to produce several duplicate works of a particular image or portrait in different objects. Known laser systems which are used to produce an image inside of an optically transparent material use only one beam, treat only one article and make only one etch point for one pulse of the laser. It is an object of the invention to create a laser system that allows for the production of multiple portrait images, simultaneously creating etch points inside every image at the same time.

It is also an object of the invention to provide a system and method which permits the production of an image, such as a portrait, inside optically transparent material with a number of points or pixels and gray shades (i.e. the same resolution) similar to the computer processing image.

It is also an object of the invention to provide a method and apparatus for generating etch points inside a material which are other than shades of gray, such as iridescent (i.e. etch points having a multi-color appearance as a result of their expansion of white light into a color spectrum).

It is also an object of the invention to provide a laser-computer graphics system for creating a sculpture or the like which combines methods of production 3-D images and portrait images, so that each viewer observing the sculpture sees the image with a similar resolution to the computer image and without a defined point structure.

SUMMARY OF THE INVENTION

The invention generally comprises a variety of methods and systems for producing an image, such as a portrait or 3-D sculpture, inside a transparent object.

In one or more embodiments, the invention comprises the method of obtaining a basic image comprising at least two of gray shades, generating a number of sub-images corresponding to the number of gray shades of comprising the basic image, determining a number of auxiliary images from the sub-images, each auxiliary image comprising one or more points spaced apart by greater than a first minimum distance for which failure of the object may occur, and generating the auxiliary images in the object, each auxiliary image comprising one or more etch points positioned in a plane in the object and formed in said object by laser radiation and spaced apart by at least the first minimum distance, the auxiliary images lying in parallel planes spaced apart by no less than a second minimum distance, the auxiliary images, when viewed in a direction generally perpendicular thereto forming a reproduction of the basic image.

In one or more embodiments, the gray shades of the reproduced image result from the alignment of etch points in planes perpendicular to a viewer. In one or more other embodiments, the gray shades are produced by varying the dimensions of the etch points, such as by changing the number of laser pulses or the laser pulse energy used to generate an etch point. In one or more embodiments, the gray shades are produced by varying the density of the etch points.

One or more embodiments of the invention comprise a method and system for generating etch points in more than one object simultaneously. One or more embodiments of the invention comprise a method and system for creating etch points with multiple beams, these etch points having improved optical characteristics.

Yet another embodiments of the invention comprises a method and system for generating etch points which are iridescent.

The invention realizes many advantages over the prior art. One advantage of the invention is in providing a computer graphics and laser system that permits the simultaneous generation of images in multiple articles.

Another advantage of the invention is in providing a method of improving the contrast of a multi-layer portrait by decreasing a minimum distance between adjacent layers. In one or more embodiments, such is permitted by generating concentrated etch points with at least two beams of laser energy.

Another advantage of the invention is in providing a method of transforming computer image gray shades into gray shades of a portrait reproduced inside transparent material without substantial fluctuation of the gray shade values by adjusting etch point shape, using repeated breakdown pulse radiation directed at the same point, or by producing corresponding number of etch points following one after another and belonging to adjacent planes inside the article.

Another advantage of the invention is in providing a computer graphic system that permits the generation and production of 3-D sculptures inside optically transparent material based on the unification of 3-D methods and the portrait/image production methods. Such permits the generation of a portrait sculpture with a high resolution similar to the computer displayed/generated image without a discernable point structure. In accordance with the invention, the 3-D sculpture portrait is generated by two "sandwich" portraits (front and profile) each of which is produced by the aforementioned method. These portraits are perpendicular each other, their etch points arranged in the 3-D area of the sculpture so that etch points of a front "sandwich" portrait belong to a profile "sandwich" portrait.

Still another advantage of the present invention is a method of creating iridescent etch points and images including iridescent etch points.

Further objects, features, and advantages of the present invention over the prior art will become apparent from the detailed description of the drawings which follows, when considered with the attached figures.

DESCRIPTION OF THE DRAWINGS

FIG. 4(a) consists of those areas of the basic image where all gray shades, except black, is not equal to zero; FIG. 4(b) consists of those areas of the basic image where all gray shades, except black and a first gray shade next to black are not equal to zero; FIG. 4(c) consists of those areas of the basic image where all gray shades, except black and the first and a second gray shade adjacent black are not equal to zero, FIG. 4(d) consist of those areas of the basic image where all gray shades, except black and the first, second and a third gray shades are not equal to zero.

FIG. 5(a) is a single etch point projection; FIG. 5(b) is a projection of two etch points following one after another; FIG. 5(c) shows a plurality of different etch points; and FIG. 5(d) shows projections of two adjacent etch points on XY plane points where "d" is diameter of an approximation circle and "$d_0$" is minimum distance between them.

FIG. 6(a) illustrates breakdown due to a Q-switched pulse in glass (From B. M. Ashkinadze et. al. Sov. Phys. JETF, 23, 788, 1966)

FIG. 8(a) shows fragment all four auxiliary images formed from the image illustrated in FIG. 4(a): pixels numbered #1 belong to a first auxiliary image and consists of plurality of points #1 illustrated in FIG. 7(a); pixels numbered #2 belong to the second auxiliary image and consists of plurality of points #2; pixels numbered #3 belong to the third auxiliary image and consists of plurality of points #3; and pixels numbered #4 belong to the fourth auxiliary image and consists of plurality of points #4.

FIG. 21 (a) corresponds to one laser pulse; FIG. 21 (b) is two laser pulses; FIG. 21(c) is three laser pulses; and FIG. 21(d) is five laser pulses. The etch points were produced inside an optically polished, high-index lead oxide cut glass by Ultra-GRM Laser with pulse energy 0.8 mJ.

DETAILED DESCRIPTION OF THE INVENTION

The invention comprises a variety of methods and apparatus for generating one or more images inside an optically transparent material by laser radiation. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention Although the invention has general applicability in the fields of computer graphic and laser systems, one or more embodiments of the invention are based in part on a computer and laser system for generating an image in the interior of optically transparent material.

Figure 1:
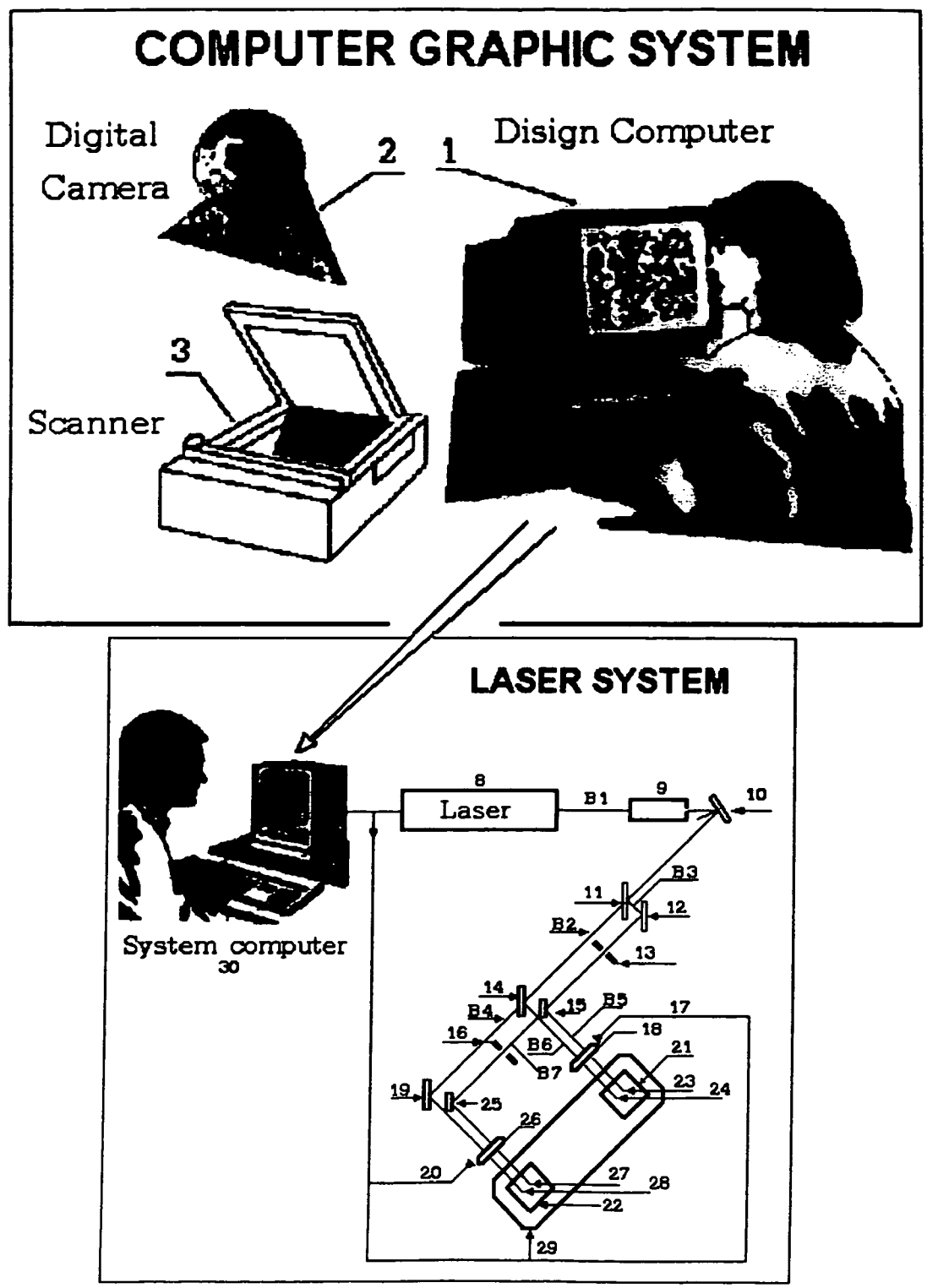
FIG. 1 is an exemplary block-diagram of a laser etching system of the invention for use in simultaneously producing multiple (in the illustrated embodiment, four) etch points simultaneously and reproduce multiple (in the illustrated embodiment, two) identical images inside optically transparent material.

Reference is now made to FIG. 1, which illustrates in block-diagram form a laser etching system in accordance with one embodiment of the invention which may be used to produce multiple (in the illustrated arrangement, four) etch points simultaneously for reproduction of multiple (in the illustrated embodiment, two) identical images inside multiple (in the illustrated embodiment, two) articles simultaneously.

The system generally comprises two subsystems. A first computer graphic system develops and transforms a given image, such as a design (portrait) or model (sculpture), into computer data/program for reproduction of the image in optically transparent material. In the embodiment illustrated, this computer graphic system includes a design computer 1 which is capable of receiving image input from a digital camera 2 and/or scanner 3. Those of skill in the art will appreciate that the system used to generate a computer graphic image may vary from that illustrated.

A second laser system uses information from the computer graphic system to create one or more images in an optically transparent material by generation and focusing a laser beam inside the material. The laser system is controlled by a system computer 30 storing image data received from the design computer 1, as well as control data. It is possible, however, for the system computer 30 and design computer 1 to be one and the same.

The computer 30 controls a laser 8 that generates a narrow, intense beam of light. In one or more embodiments, the light is infrared light. Once emitted from the laser 8, the pulsed beam B1 passes through a beam expander 9 and to a transfer mirror 10 that directs the beam B1 to a beamsplitter 11, which divides the laser beam into two separate beams B2 and B3. The beam B3 is reflected by a mirror 12 toward a shutter 13, which blocks beam B3 when only one beam is used, or allows it to pass unobstructed when two beams are used. After passing through the shutter 13 the beam B3 passes to beamsplitter 15 which divides the laser beam into two separate beams B5 and B7. The beam B5 is focused by an optical system 18 at a selected point 24 inside an article 21. The beam B2 passes to beamsplitter 14 which divides the beam into two separate beams B4 and B6. The beam B6 is directed to the optical system 18 which focuses it (similar to the beam B5) at a selected point 24 inside the article 21.

The beam B4 is reflected by a mirror 19 and focused by an optical system 26 at a pre-set point 28 inside an article 22. The beam B7 passes through a shutter 16 and thereon to a transfer mirror 25 that directs it to the optical system 26 which focuses the beam B7 at the selected point 28 inside the article 22. Each of the beamsplitters 11, 14 and 15 divide the beams so that beams B4, B5, B6 and B7 have the same energy.

The articles 21 and 22 are supported by a table 29 that moves them along X and Y axes in a coordinate system plane perpendicular to directions of the beams 4, 5, 6 and 7. Thus, positions of the etch points 23, 24, 27 and 28 are controlled along the X and Y axes. The computer 30 supplies the table drive 29 with control signals to provide positioning. Optical system drives 17 and 20 move the focus positions of the beams B4, B5, B6 and B7 along their directions (i.e. the Z axis) in accordance with control signals supplied by the computer 30. In this manner, the positions of the etch points 23, 24, 27 and 28 are controlled along the Z axis. Control of etch point positions along all three axes X,Y,Z can be also done by moving only table 29, if special drive is used, or by only special optical system 26 removing focus positions of the beams along X,Y,Z axes.

In order for each of the split beams to have sufficient energy level to create an etch point within the material, the original beam must have a sufficient high energy level as well. For example, the energy required to create an etch point in some materials is 0.75–0.85 mJ, requiring that the original beam provide at least 1.5–1.7 mJ of energy when a single beam is split into two beams. In one or more embodiments, the laser 8 comprises an ULTRA GRM laser produced by Big Sky Laser Tec, Inc.

The term "optically transparent material" as used herein is meant to refer to any material which is sufficiently transparent to permit a viewer to see into the structure of the material and observe an image produced therein. In one or more embodiments, the material may comprise glass, such as leaded glass (PbO). Of course, the glass may be clear or colored.

In one or more embodiments, the computer graphic system services to transform initial preprogrammed or provided image data to a number of pixels which correspond to points within the transparent material in which the breakdowns are required to create the image in the selected optically transparent material. The image data may represent a 2D object (for example, a portrait) or a specific 3-D object, a copy of which is to be reproduced inside the article(s) 21, 22. As described above, the image data of the object may be supplied to the design computer 1 using a digital video camera 2, a scanner 3, or any other photoelectric or magnetic device that converts an image into corresponding electric signal for processing by the computer 1.

It will be appreciated that such an image may comprise a number of mono-tone "gray" shades. By gray shades, it is meant that the shades have no colors, but comprise black and white and one or more shades of gray therebetween. Such shading is well known.

As described herein, various of the systems and methods are adapted for producing a portrait or 3-D sculpture in an object. Of course, the systems and methods may be used to produce a wide variety of images, both appearing 2 or 3 dimensional. By "portrait" it is generally meant an image requiring high resolution to discern the details thereof. A portrait may or may not comprise the image of a human. It is also noted that the image which is produced in the object does not need to correspond to a real-life image, but could be created entirely in a computer system. For example, a portrait need not be derived from a photograph, but could comprises a drawing created by an artist with a computer program.

In one or more embodiments of the invention it is desirable to reproduce an image inside of the material where the reproduced image is comprised of the same or similar multiple gray shades which comprise the original image. Thus, one or more embodiments of the invention comprise systems and methods used to generate data for values of laser pulse energy for production of etch points in the selected transparent material having different gray shades, for etch points having differing dimensions, and the minimum distances between etch points (both in X-Y plane, which is perpendicular to the laser beam direction, and along the Z axis, which coincide with direction of laser beam) that can be used without causing breakage of the material for selected energy values for reproducing an image in a material. Such data can be supplied to or generated by the computer 1.

One or more embodiments of the invention comprise a computer graphics-laser system and method for transforming initial image data into a plurality of etch points for generating an image inside an object. Several different systems and methods are described in accordance with the invention.

As one aspect of several of the invention, methods and systems for generating images in a material comprising points having differing shades of gray are disclosed. In one embodiment of the invention described in detail below, gray shades are generated by locating one or more etch points in alignment in adjacent planes inside the article. In another embodiment of the invention, each gray shade is reproduced by varying the size of the etch points. In yet another embodiment of the invention, gray shades are produced by varying the density of points covering the area of the image.

A first embodiment of the invention is based upon the physical phenomenon that if a viewer looks at etch points in the material where two or more etch points are aligned one after another and they are not far from each other, then the viewer sees their projection on visual plane (i.e. plane perpendicular to observation direction) as having a brightness greater than a single point. In other words, the greater number of points which are positioned in alignment, the higher the sum of the brightness of their projection. A first method of gray shade generation of the invention has the very important advantage of reducing gray shade fluctuation since the brightness of their projection comprises the average brightness of the separated points.

By way of illustration, FIG. 5(a) shows an etch point projection having a first brightness. FIG. 5(b) is a projection of two etch points following one after another, this projection having a greater brightness. FIG. 5(c) shows a plurality of different etch points. It can be seen that these etch points, even though produced with the same laser energy, have random shapes. As a result, the gray shade created by these points fluctuates greatly over the area of the reproducible image. The projections of two points provides smaller fluctuations, however.

A method of generating an image in accordance with this embodiment of the invention is as follows:

Step A1: A true color portrait or other image with a sufficiently high resolution is supplied into computer 1 and converted to 8-bit gray-scale. The number of the shades of gray in the image is reduced as much as possible without reducing substantially the high quality of this basic image. The number of the gray shades of the basic image after minimization is referred to herein as M. In general, a first shade generally comprises black and another shade white, and one or more shades in between comprising various shades of gray. It is noted that a wide variety of known methods, including software, are available for converting an image to 8-bit grayscale, and for reducing the number of gray shades. As such, these methods will not be described in detail herein.

Step A2: M images are formed from the basic image. A first image consists of areas in which each of the gray shades, except black, is not equal to zero (i.e. the first image comprises all areas of the original image except where the shade black is present); the second image consists of areas where all gray shades, except black and the a gray shade adjacent thereto, are not equal to zero; the third image consists of areas in which all gray shades, except black and two adjacent gray shades, are not equal to zero, and so on.

Step A3: Using information such as that described above which has been supplied to the computer 1 regarding the material, the laser pulse energy value permitting the reproduction of the gray shade which is the nearest to black is determined.

Step A4: The approximate dimensions of the etch points for this energy value and the minimum distances between etch points (both in X-Y plane, perpendicular to the beam creating the point, and along Z axis, parallel to the beam) which can be produced without the breakage of the material for this energy are determined.

Figure 7:
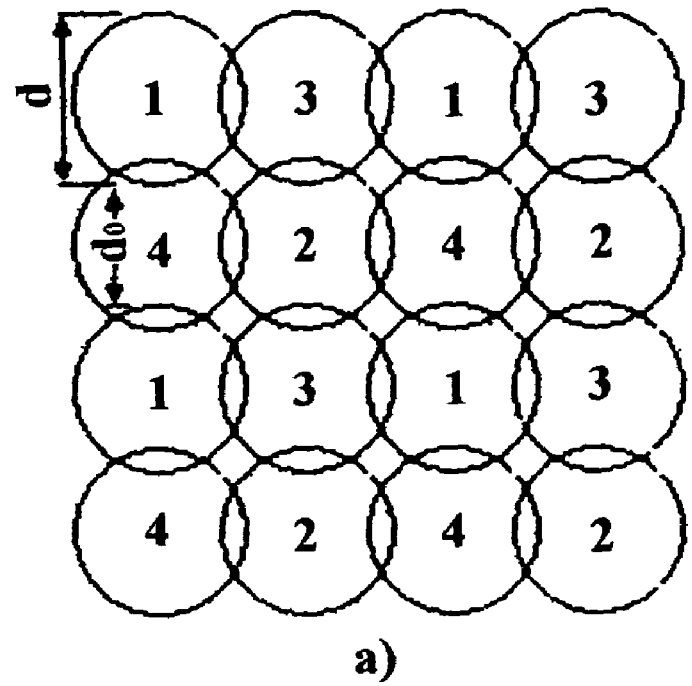
FIG. 7(a) illustrates a first etch point cover arrangement necessary to cover an image completely when a distance $d=d_0$: points #1 belong to a first duplicate image; points #2 belong to a second duplicate image; points #3 belong to the third duplicate image and points #4 belong to a forth duplicate image.
FIG. 7(b) illustrates a second etch point cover arrangement when $2d=d_0$.
Figure 7:
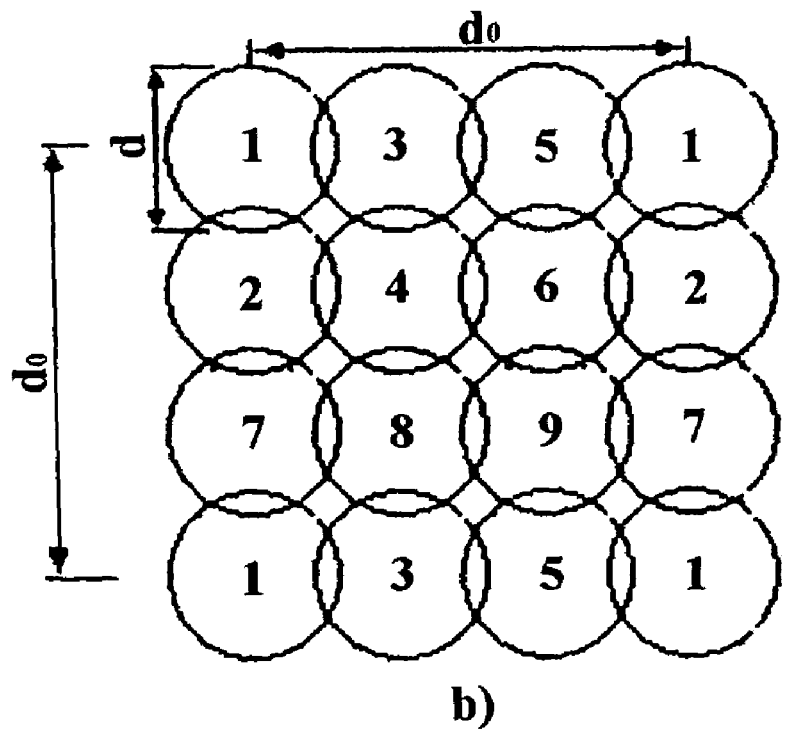

Step A5: One or more duplicates of each image from the formed M images are produced. Each duplicate is covered by a special plurality of points so that the distances between adjacent etch points in the material are not smaller than the minimum distance in X-Y plane, as determined for the gray shade which is nearest to black. FIG. 7 shows two arrangements for such a plurality of points. FIG. 7(a) illustrates a case when the minimum distance $d=d_0$ and FIG. 7(b) illustrates a case when the minimum distance $d=2d_0$. In the first case it is sufficient to use four duplicates of an image to cover an area completely, and in the second case it is necessary to have nine duplicates of an image to cover it completely.

Step A6: A plurality of points of the duplicates belonging to each of the M images is formed so that the projections of the points of all the duplicates fill in the area of the reproducible image completely. This condition determines the requisite number of duplicates.

Step A7: The plurality of points corresponding to each duplicate is produced on a plane which is parallel with respect to the portrait plane. This creates an auxiliary image.

Step A8: All auxiliary images are produced with distance between them equaling (or at least not less than) the minimum distance L along the Z axis which prevents breakage of the material.

In accordance with this embodiment, two or more layers are produced and together they produce the basic image with the same resolution. A viewer sees the "sandwiched" auxiliary layers as a single image without a defined point structure.

One important aspect of this embodiment of the invention over the prior art is that the creation of the etch points takes into account the minimum distance "L" of the planes containing the points.

Figure 3:
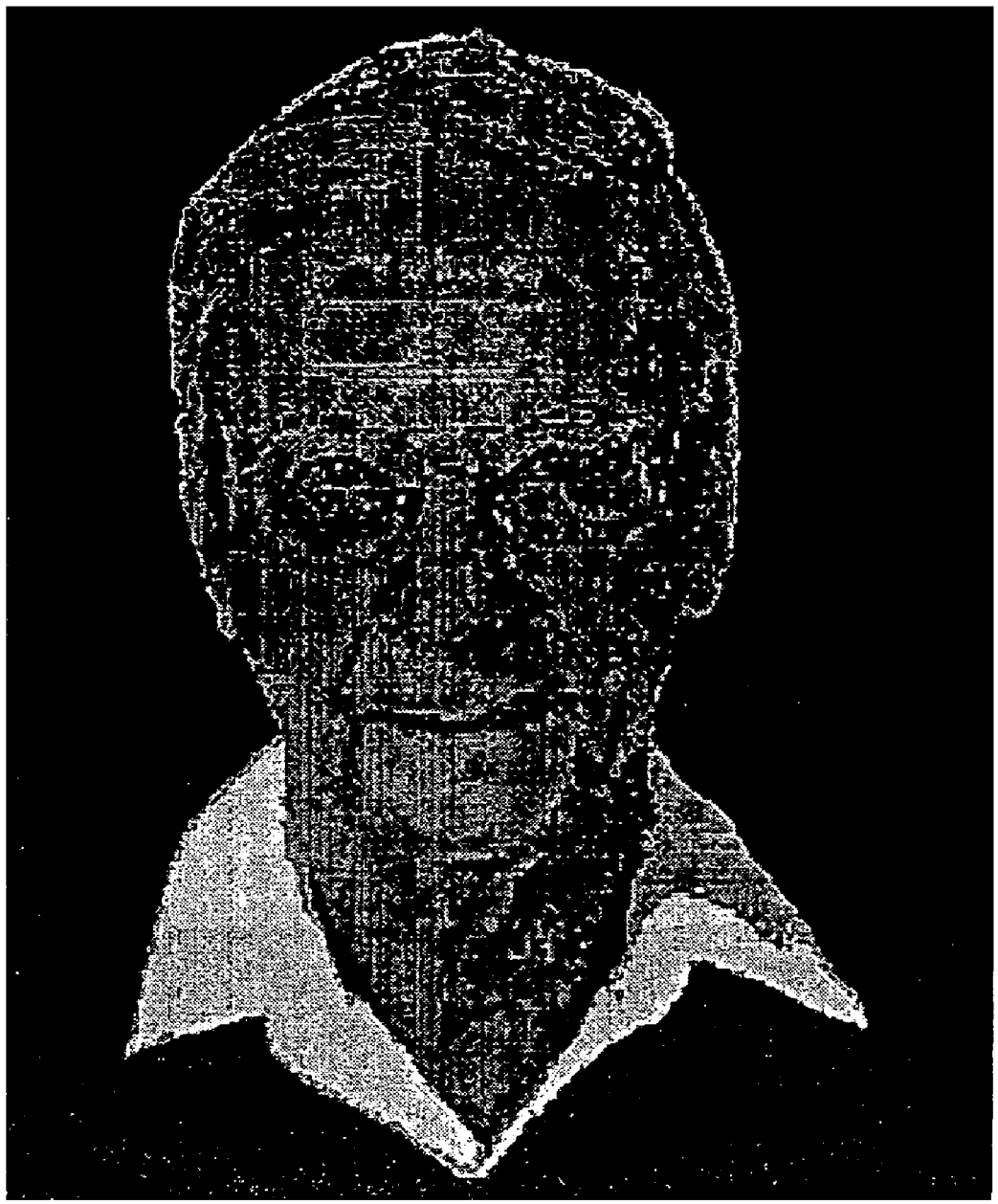
FIG. 3 shows a portrait of professor N. Bloembergen after it was supplied into a computer, converted to 8-bit gray-scale and the number of the shades of gray was decreased to a basic image having shades M numbering 5 (black, a first gray shade, a second gray shade, a third gray shade and white).

For purposes of illustration of this method in which every gray shade is reproduced by using a number of layers, an example is illustrated and will be described below. FIG. 3 shows a portrait of professor and Nobel Laureate N. Bloembergen (the first person who observed the material breakdown phenomenon in 1962) after the image was supplied into a computer, converted to 8-bit gray-scale and the number of the shades of gray was decreased to a basic image comprising five shades (M=5).

Figure 4:
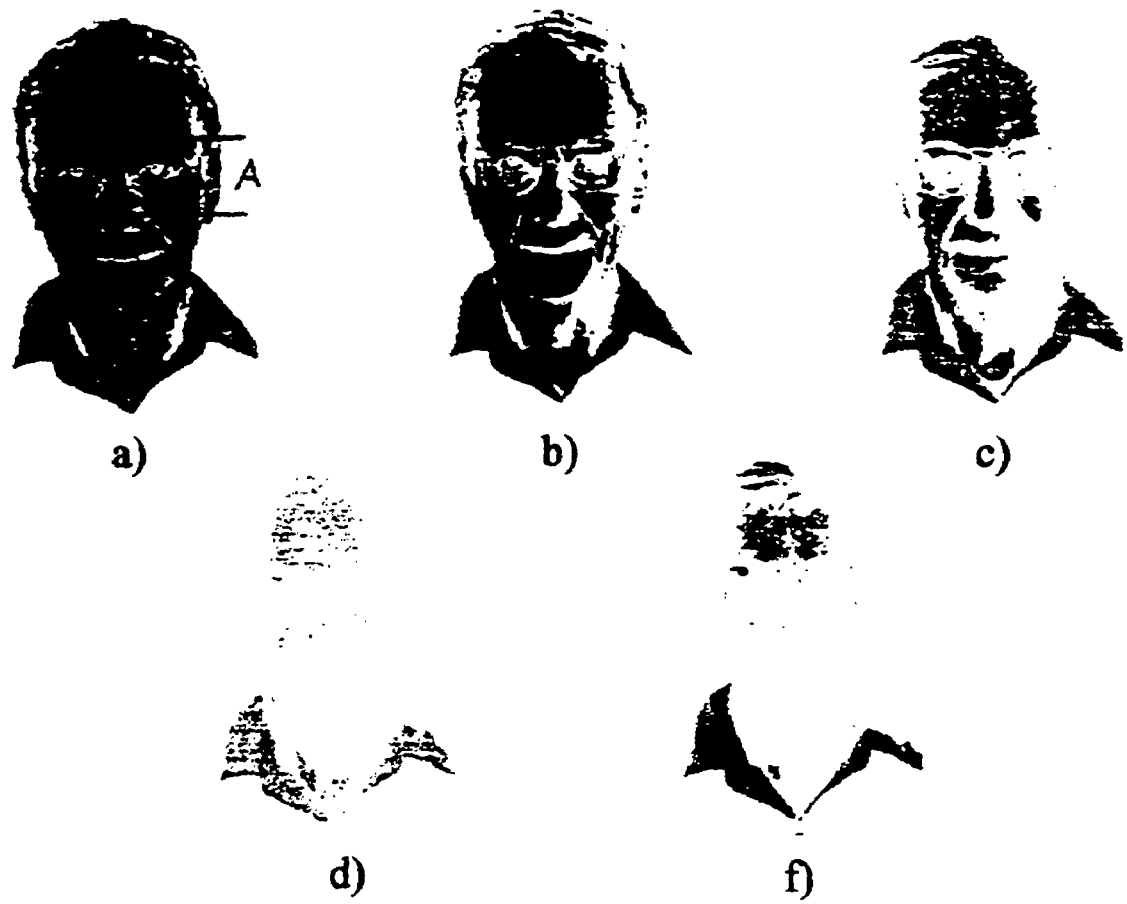
FIGS. 4(a)–(e) show five (M=5) images formed from the basic image of FIG. 3 in succession.
FIG. 4(f) consists of those areas of the basic image where a white shade is not zero.

FIG. 4 shows five images corresponding to the five shades formed from the basic image. FIG. 4(a) shows an image corresponding to the basic image where all gray shades, except black, are not equal to zero. FIG. 4(b) shows an image corresponding to the basic image where all gray shades, except black and a first gray shade adjacent black, are not equal to zero. FIG. 4(c) shows an image corresponding to the basic image where all gray shades, except black and first and second gray shades adjacent black, are not equal to zero. FIG. 4(d) shows an image corresponding to the basic image where all gray shades, except black and first, second and third gray shades adjacent black, are not equal to zero. FIG. 4(f) shows an image corresponding to the basic image comprising where the remaining gray shade (white) is not zero.

FIG. 5(d) shows a typical schematic projections of two etch points in the transparent material on the plane which is parallel with respect to the portrait plane and is perpendicular to beam. Laser damage can take a wide variety of form and circles are only an approximation: d is its diameter and $d_0$ is minimum distance between adjacent etch points.

FIGS. 6(a) and (b) show examples of typical projections of etch points on plane XZ which is parallel with respect to the direction of a projected laser beam. As illustrated, in some instances, the projection distance "L" of the etch points in the direction parallel to the beam may be significantly greater than the distance "d" (see FIG. 5) perpendicular to the beam.

From experimental data provided to the system computer, it may be determined in this example case that for the selected material of the article and for the selected pulse laser energy necessary to generate the shade of gray adjacent black, the value "d" is approximately equal to "$d_0$." From computer data it is also determined that for transformation the first (after black) gray shade it is necessary to fill in the corresponding area completely.

To provide the desired point coverage satisfying these demands is shown in FIG. 7(a): four duplicate images must be produced, with points #1 belonging to the first duplicate; points #2 belonging to the second; points #3 belonging to the third duplicate and at last points #4 belonging to fourth one. These pluralities of points can also be described following way: the points of the first plurality have even coordinates X,Y; the points of the second one have odd coordinates X,Y; the third plurality consists of points with even X and odd Y coordinates; and the forth plurality consists of points with odd X and even Y coordinates.

Figure 8:
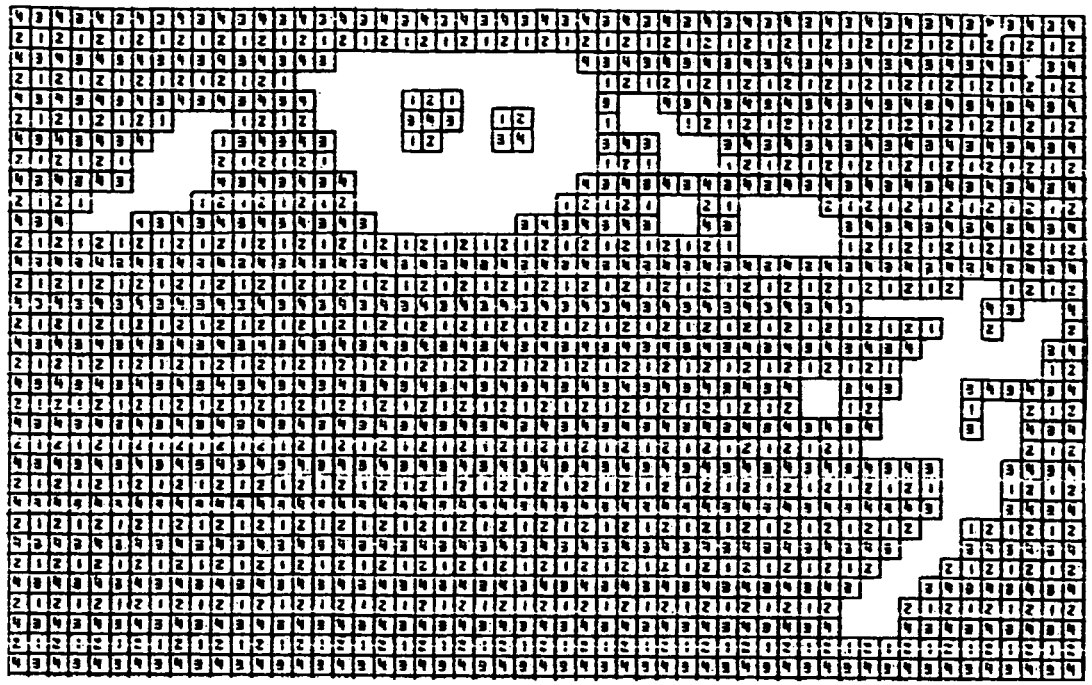
FIGS. 8(a) and (b) shows the fragment A (from FIG. 4(a)) including multiple auxiliary images.
FIG. 8(b) is shows the fragment A for nine auxiliary images formed in accordance with the arrangement of points illustrated in FIG. 7(b)
Figure 8:
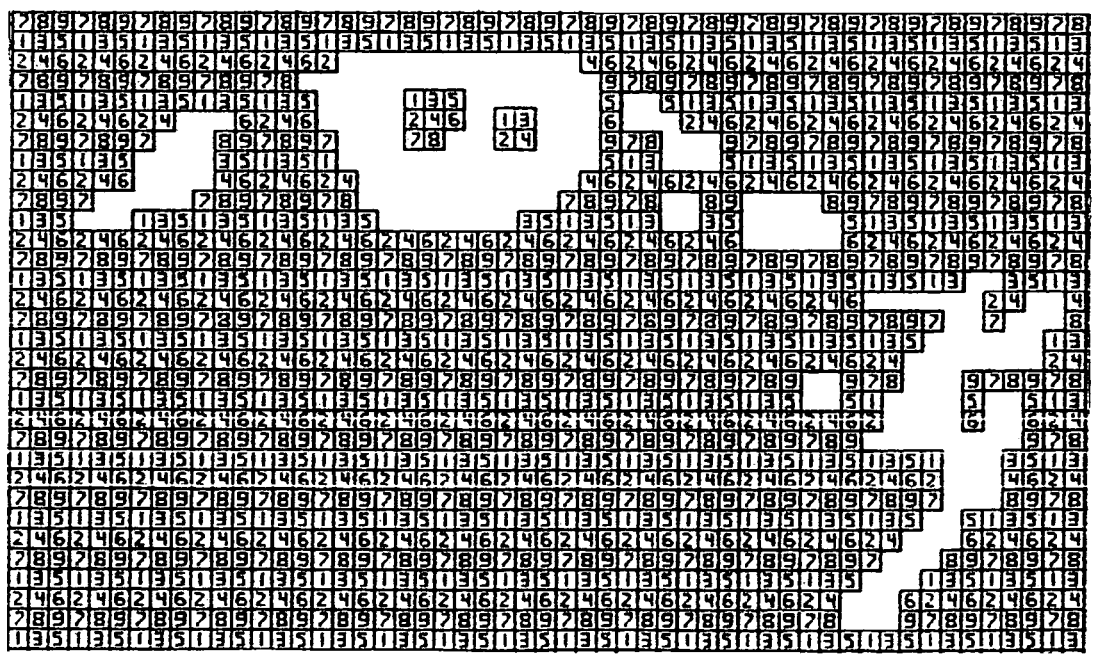

Four duplicates of the image shown in FIG. 4(a) are then produced, each duplicate comprising each set of these pluralities of points. FIG. 8(a) shows the resulting four auxiliary images for the fragment A illustrated in FIG. 4(a). FIG. 8(b) shows how the auxiliary image would appear if formed from nine duplicates.

Figure 9:
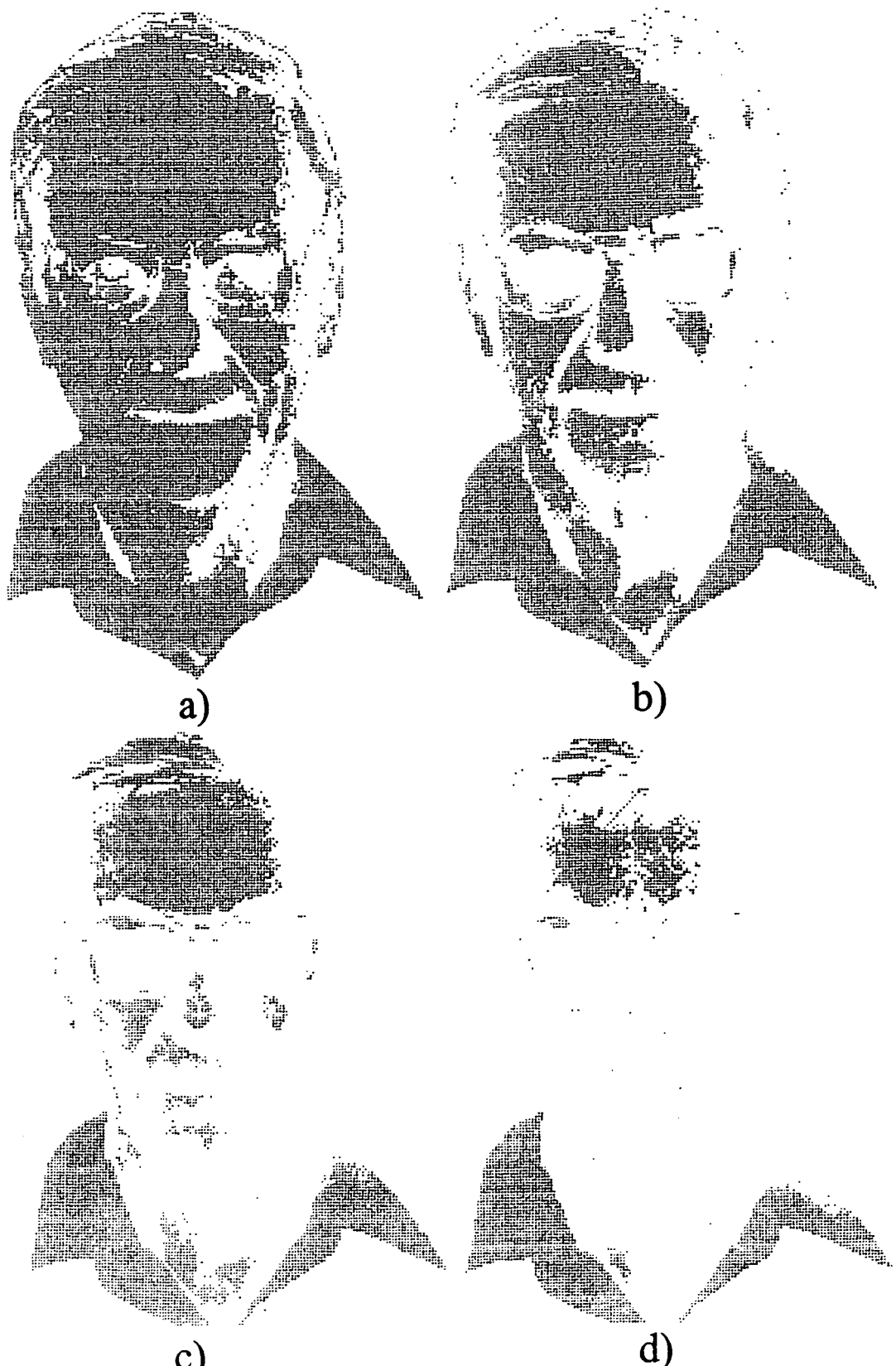
FIGS. 9(a)–(d) illustrate four auxiliary images corresponding to the images of FIGS. 4(b), (c), (d) and (f) covered by a plurality of points #1, #2, #3 and #4, respectively.

From analogous data it is determined that for generation the next gray shade (i.e. the second gray shade after black) that it is enough to add only one layer of etch points (i.e. only a single duplicate is necessary, thus generating one auxiliary image) to the four auxiliary images formed before, and this additional layer may be covered by any one of the plurality of points shown on FIG. 7 (for example, points #1). FIG. 9(a) shows the next auxiliary image formed from the image illustrated in FIG. 4(b) after its covered by a plurality of points #1.

For generation of the third (after black) gray shade it is again enough to add one more layer to five layers and this new layer may contain one of the remaining plurality of points, such as points #2. The auxiliary image corresponding to the image illustrated in FIG. 4(c) is shown in FIG. 9(b). For reproduction the fourth (after black) gray shade one more layer should be added. The corresponding auxiliary image to that illustrated in FIG. 4(d), covered by plurality of points #3, is illustrated in FIG. 9(c).

Lastly, the last gray shade (white) is reproduced by addition of one more layer of etch points: the plurality of points #4. This corresponding auxiliary image is illustrated in FIG. 9(d).

In accordance with this method, eight auxiliary images are formed to generate a reproduction of the basic image illustrated in FIG. 3 with like resolution and without a defined point structure. Each auxiliary image is produced on a plane which is parallel to the others and a "portrait plane." The "portrait plane" is a perceived plane in which the image lies when the image is viewed by a viewer.

Figure 6:
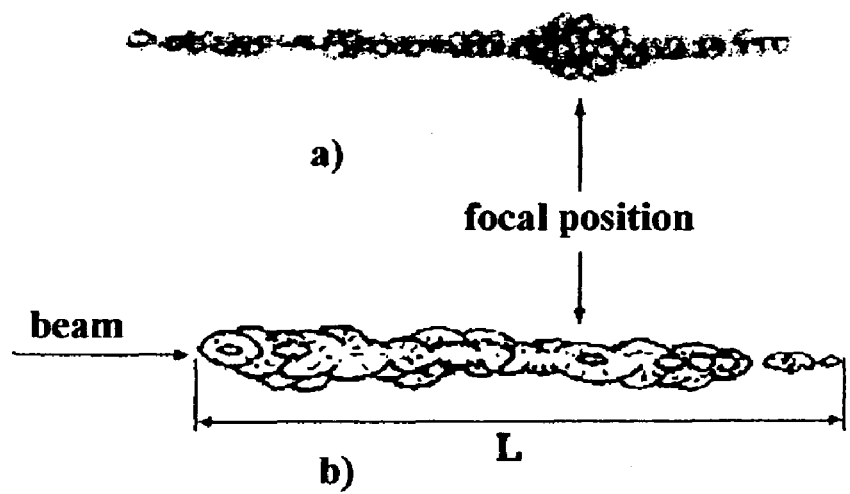
FIGS. 6(a) and (b) show examples of typical projections of etch points on plane XZ which is parallel with respect to the direction of a beam.
FIG. 6(b) is a schematic drawing of fracture zone produced in glass by Q-switched ruby laser pulse, showing overlapping bubble structure, where "L" is the length of the crack along a Z axis (From John F. Ready, *Effects of high Power Laser Radiation*, 1971, NY Academic Press, page 284).
Figure 10:
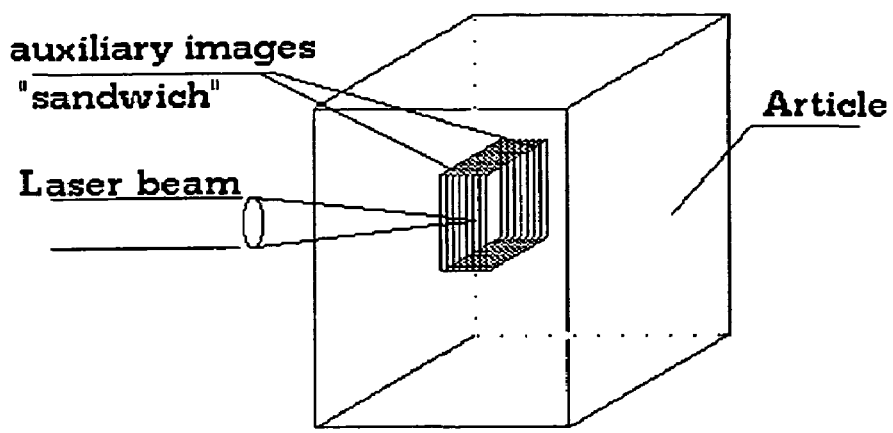
FIG. 10 shows a portrait formed from an arrangement of 8-layers of etch points in "sandwich" format formed from the auxiliary images of FIGS. 8 and 9.
Figure 11:
FIG. 11 shows a portrait which was produced in an optically polished, high-index lead oxide (PbO) cut glass, known also as lead crystal of glass, having 8-layers as illustrated in FIG. 10.

In accordance with the arrangement illustrated in FIG. 6, the distance between these planes of auxiliary images equals "L," "L" being a minimum distance between points in adjacent planes. FIG. 10 illustrates that the resulting portrait comprises not one, but eight-layers. FIG. 11 shows a portrait which was produced in an optically polished, high-index lead oxide (PbO) cut glass (known also as lead crystal of glass) in accordance with this method and comprising 8-layers.

A second embodiment of the invention is based upon the physical phenomenon that when the dimensions of an etch point increase, its brightness increases. Different dimensions of etch points can be achieved in at least the following two ways: (1) the dimensions of an etch point increase when the laser radiation energy used to create the point increases; and (2) the dimensions of an etch point increase as the number of laser radiation pulses directed at the same point increases.

Another embodiment of a method of the present invention consists of the following steps:

Step B1: This step is the same as step A1 of the previous embodiment.

Step B2: A number of one-shade gray images M are formed from the basic or original image. Unlike the previous method, these images are not identical to the basic image. Instead, a first one-shade image consists only of those areas of the basic image where the gray shade nearest to black is not equal to zero. The second one-shade image consists of only those areas where the second gray shade is not equal to zero, and so on. In this arrangement, areas of each one-shade image do not have any points which are common to any other one shade image.

Step B3: Using information which is in the computer 1, the laser pulse energy values which allow the basic portrait image to be reproduced inside the selected optically transparent material with the M gray shades are determined. Thus, unlike the previous technique not one, but M, energy values are determined.

Step B4: The approximate dimensions of the etch points for these M energy values and the minimum distances between corresponding etch points (both in X-Y plane and along Z axis) that can be produced without the breakage of the material for the pre-determined energy values are determined.

Step B5: One or more duplicates of each one-shade image are produced and each duplicate comprises a special plurality of points, the points of the duplicates chosen so that the distance between adjacent etch points in the material are equal to the minimum distance in X-Y plane, determined for that gray shade.

Step B6: A plurality of points of the duplicates belonging to each one-shade image are formed so that the projections of all points of all areas with the same gray shade fills in the area completely. This condition determines the requisite number of duplicates.

Step B7: The plurality of points of duplicates for different duplicates is united in one auxiliary image. If in result of the unification any adjacent points have distance between them smaller than the requisite minimum distance ("d" in a direction perpendicular to the beam), then one of these points is placed on an additional auxiliary image.

Step B8: Every auxiliary image is produced separately in a plane which is parallel with respect to the portrait plane. A distance between the parallel planes is set equal to a maximum value of all the minimum distances along Z axis determinated for each of the M gray shades.

Figure 12:
FIG. 12 shows a portrait of professor Charles Townes after it was supplied into a computer, converted to 8-bit gray-scale and the number of the shades of gray was decreased to a basic image having three shades (M=3: black, gray and white).
Figure 13:
FIG. 13 shows a one-shade image selected from the basic image of FIG. 12, the shade corresponding to the black shade.
Figure 14:
FIG. 14 shows a one-shade image selected from the basic image of FIG. 12, the shade corresponding to the gray shade.
Figure 15:
FIG. 15 shows a one-shade image selected from the basic image of FIG. 12, the shade corresponding to the white shade.
Figure 16:
FIG. 16 shows a duplicate of the image illustrated in FIG. 14, covered by a first plurality of etch points #1.
Figure 17:
FIG. 17 shows a duplicate of the image illustrated in FIG. 14, covered by a second plurality of etch points #2.
Figure 18:
FIG. 18 shows a duplicate of the image illustrated in FIG. 14, covered by a third plurality of etch points #3.
Figure 19:
FIG. 19 shows a duplicate of the image illustrated in FIG. 14, covered by a fourth plurality of etch points #4.

An example of this method is illustrated and will be described next. FIG. 12 shows a portrait of professor and Nobel Laureate Charles Townes (inventor of the maser) after the portrait image was supplied into a computer, converted to 8-bit gray-scale and the number of the shades of gray was decreased to a basic image having three gray shades M=3 (corresponding to a first shade of gray (black), a second shade of gray and a third shade of gray (white)). FIG. 13 shows a black shade image derived from the basic image. FIGS. 14 and 15 show the analogous one-shade images which correspond to the second and third (white) gray shades. The sum of the images from FIGS. 13, 14 and 15 comprises the basic image illustrated in FIG. 12. It is important to note again that unlike the aforementioned method, in accordance with this method, these images have no common areas.

Unlike the previous technique, it is necessary to determine data for two values of laser energy for creation of the etch points for producing the second gray shade and the third gray shade (white). In this case it is found that both the second gray and the white shades can be transferred by points with a distance between them being approximately like their dimensions in plane XY. Of course, the values of "$d_0$" and "L" for the white shade are larger than for the second gray shade but the correlation between them is similar. Consequently, a cover arrangement such as that illustrated in FIG. 7(a) can be used for the images illustrated in FIGS. 14 and 15.

For a cover arrangement such as that illustrated in FIG. 7(a), four duplicates of each image must be prepared and the pluralities of duplicates should be covered by plurality of points #1–#4. FIGS. 16, 17, 18, and 19 show duplicates of the image illustrated in FIG. 14 formed with the plurality of points #1–#4.

Figure 20:
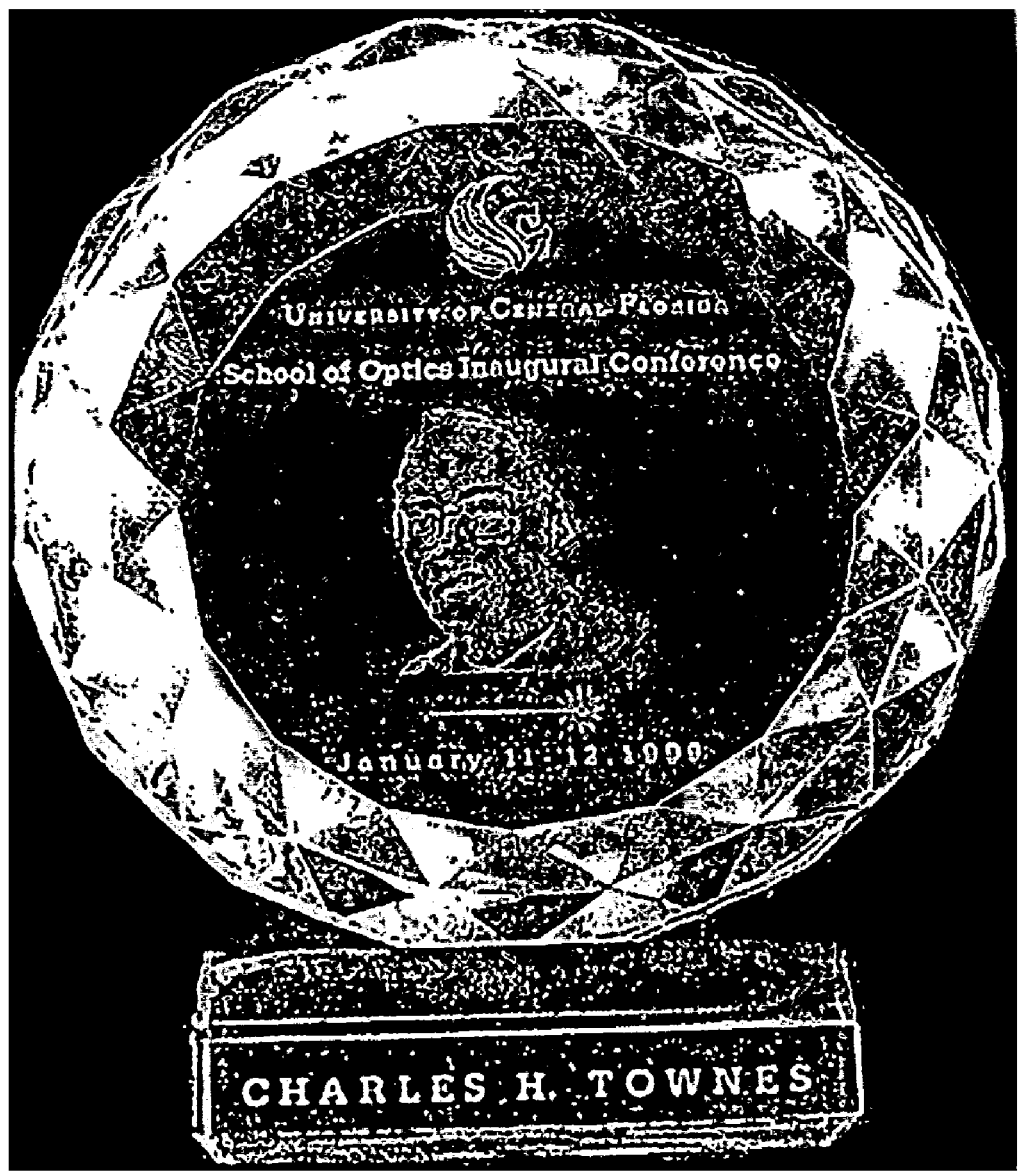
FIG. 20 shows the portrait image reproducible inside a glass by using auxiliary images illustrated in FIGS. 14–19.

By analogy, duplicate images corresponding to the image illustrated in FIG. 15 are covered but with their specific values of "$d_0$" (minimum distance in a plane perpendicular to the beam) and "L" (the minimum distance in a plane parallel to the beam). The images illustrated in FIGS. 14 and 15 have no common areas, so the auxiliary images can be formed by combination of the duplicates of all M images. The constraint that the distance between etch points should not be less than some minimum value can be violated only for boundary of areas belonging to different duplicates. Such points form one additional auxiliary image. FIG. 20 shows a portrait image produced inside glass in accordance with this method.

In accordance with another embodiment of a method of the invention, the micro-destruction caused inside the material is adjustable in size by varying the number of laser pulses focused at a pre-set point. In this method, creation of an image such as a "sandwich" portrait consists of the same 8 steps as above, excluding steps B3 and B4. In accordance with this embodiment method, the substitute steps C3 and C4 are used.

Step C3: Using information which is in the computer 1, the number of laser pulses focused at a point inside the selected optically transparent material to reproduce each selected shade M of gray is determined.

Step C4: The dimensions of the etch points produced by repetition of laser pulses and the minimum permissible distances between adjacent etch points are determined.

Figure 21:
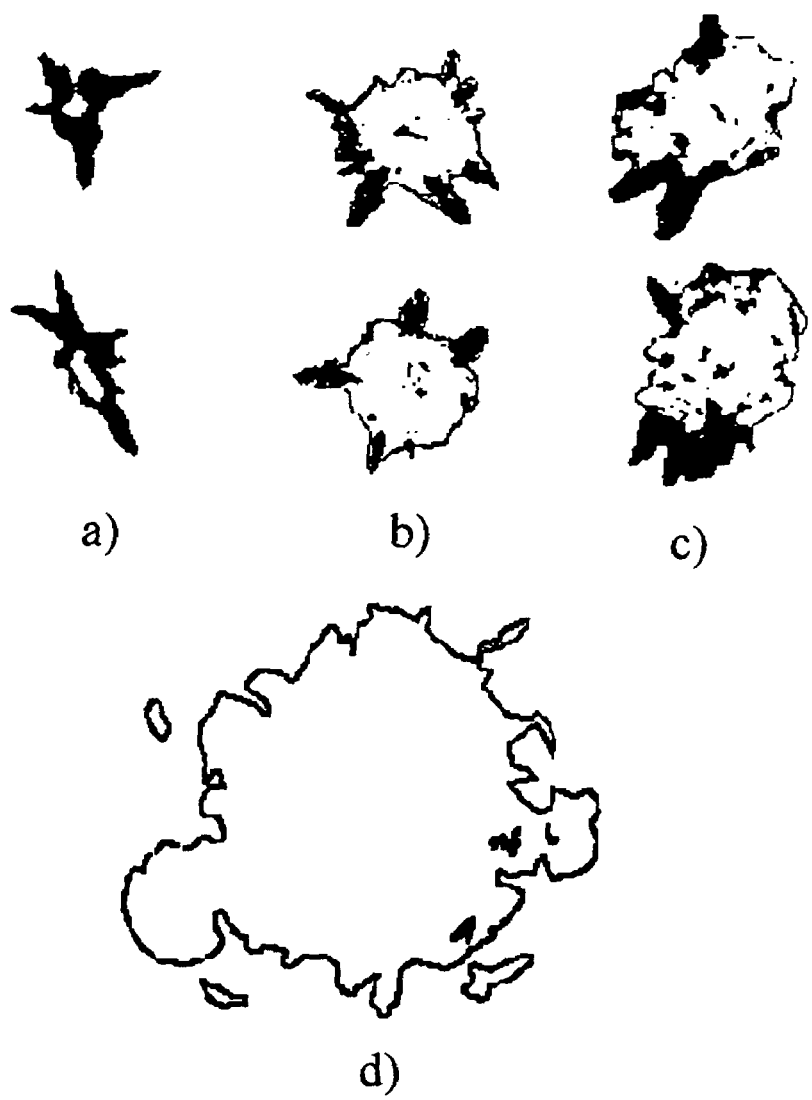
FIGS. 21 (a)–(d) illustrate transformation of the sizes and shapes of micro-destruction projections on a plane perpendicular to a laser beam as a result of the repetition of a laser pulse at the same point.

Now reference is made to FIG. 21 which illustrate the transformation of the size and shape of micro-destruction projection on plane perpendicular to laser beam as a result the repetition of laser pulses at the same point. FIG. 21(a) shows the etch point created with one laser pulse. FIG. 21(b) shows the etch point created with two laser pulses. FIG. 21(c) shows the etch point created with three laser pulses. FIG. 21(d) shows the etch point created with five laser pulses. From these figures it is clear that the repetition of focused laser pulse radiation at the same points of a material both increases the dimension of the etch points and decreases variations in their dimensions and shape of points (as compared to etch points made with less laser pulses). In general, each repeated laser pulse causes the resulting etch point to become closer in shape to a sphere.

This is very useful for reproduction of a portrait or other high-detail image. First, the greater the size of the micro-destruction, the closer the etch point is to a sphere and the greater its brightness (under the same dimensions). Second, the greater the micro-destruction, the more similar the etch points are to each other. This reduces the fluctuation in gray shade values to which they correspond. As a result the portrait reproduced by these points is brighter and the difference in brightness between shades of gray is minimized.

Comparing the first and second methods, it is noted that second requires a smaller number of etch points, but the resolution which is realized differs for different gray shades.

A third embodiment of the invention is based on the physical phenomenon that as the density of points covering an area increases, so does the perceived brightness of the area. The densest coverage corresponds to a white shade and other areas with less than the densest or complete cover comprise other gray shades. The cover arrangement illustrated in FIG. 7(a) can be used to transfer four gray shades: the plurality of #1 points transfers dark gray; the plurality of #1 plus #2 points gives another gray shade; the plurality of #1, #2 and #3 points jointly transfer light gray shade; an the plurality of all #1, #2,

3 and #4 points produces white. By analogy, the cover arrange illustrated in FIG. 7(b) can be used to transfer nine gray shades.

Figure 22:
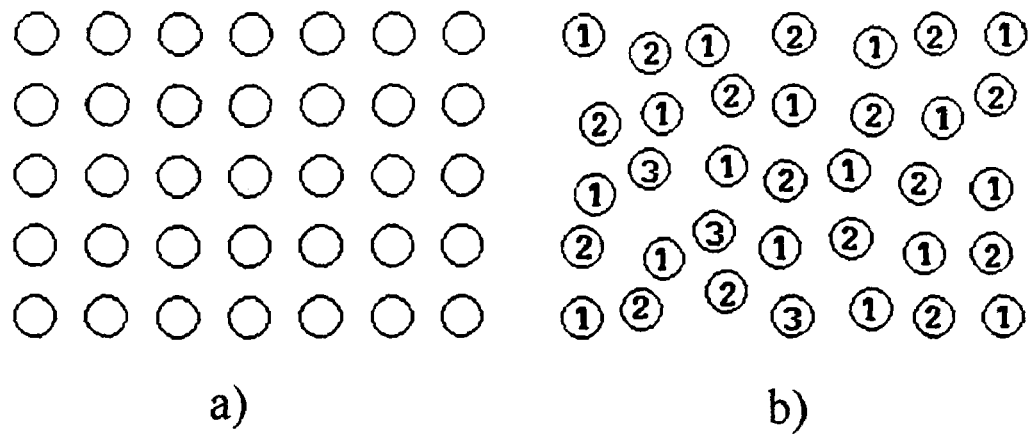
FIG. 22 shows an example of the transformation of a regular pattern of points (a) into a more random arrangement (b) while preserving their density.

It should be noted that in accordance with this method some areas are not covered completely and a point structure may be seen by the naked eye. The unpleasant effect of the perceived point structure resulting from the regular position of etch points can be eliminated by an at least partially random arrangement of the points. Adjacent points which, as a result of the random spacing, are spaced less than the minimum distance "d" should be separated to adjacent layers of the formed "sandwich". FIG. 22(a) shows an example of a regular pattern of points and FIG. 22(b) shows an arrangement of the points after an element of random spacing has been introduced. The element of random spacing is constrained by the area within which all the points must lie and by preserving their average density.

In one or more embodiments, a method in accordance with a third embodiment of the invention consists the following steps:

Step D1: This step is the same as in the prior methods.

Step D2: By analogy to the first method, M images are formed.

Step D3: Using information which is in the computer 1, the laser pulse energy value which permits the creation of a "white shade" etch point is determined.

Step D4: This step is analogous to that of the first method, but only for the white shade.

Step D5: Instead of duplicates, the M images which were formed in the second step D4 are covered with their special plurality of points so the distance between adjacent etch points in the material is not smaller than the minimum distance in the XY plane as determined for the white shade.

Step D6: A plurality of points for the M images is formed so that projections of all points of all M images on the portrait plane create a selected gray shade. These layered M images are the auxiliary images which form layers of the portrait.

Step D7: A regular pattern of points in the gray shade area is replaced by a "random" arrangement with preservation of their sum density (see FIG. 6(b)) and after that those adjacent points which are the result of the last procedure which have a distance between them smaller than "d" are carried over onto adjacent auxiliary images.

Step D8: All auxiliary images are produced with distance between them equaling a minimum distance L determined for laser energy demanded for reproduction the white shade.

Figure 23:
FIG. 23 shows portrait of Steven Chu reproducible in glass by using a technique of the present invention.

FIG. 23 shows portrait of Nobel Laureate Steven Chu produced in glass using this method of the invention.

Referring again to FIG. 1, it is noted that the laser system illustrated therein permits the production of several etch points inside an article at the same time. Using this advantage it is necessary to provide preliminary special image processing which permits division of the area of the reproducible image into two parts, a first of which is treated by only one beam and a second which can be produced by multiple beams simultaneously. The image is an auxiliary image of a multi-layer portrait. The division into two areas depends on the number of the beams and on the form of the area in which their focuses are positioned on an image plane. In all cases, however, two criteria should be satisfied: (1) the area of focus position should not cross within an area of the image and (2) the distances between adjacent focuses should not be smaller than distance which causes a breakage or other undesirable damages to the material.

Figure 24:
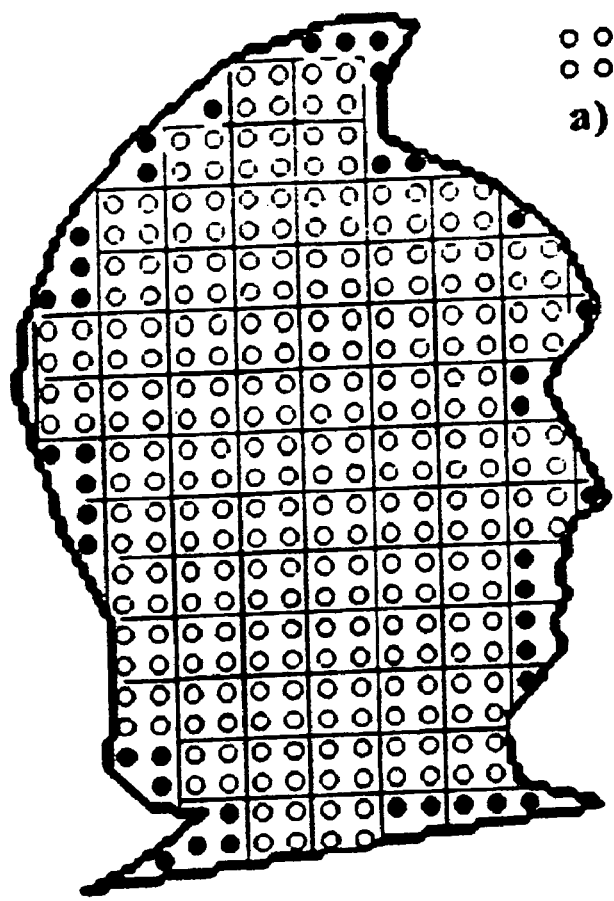
FIG. 24 shows a way of dividing image area into two parts so etch points (gray colors, numbered 1) of the first part are produced by one beam but etch points (white, without number) are produced by four beams, simultaneously.

FIG. 24 shows an example of the division of an image area into two parts when using four beams. FIG. 24(a) illustrates an area of focus positions of these four beams. FIG. 24(b) illustrates a plurality of pixels corresponding to the etch point of each auxiliary image and belonging to the first divided part (gray pixels labeled #1) and the second divided part (white pixels not labeled with a number) which can be produced by four beams at the same time. Referring to FIG. 1, the first set of pixels is produced when shutters 13 and 16 block the beams B3, and B7, the second set of pixels is produced when shutters 13 and 16 allow the beams to pass unobstructed for the desired time.

Figure 2:
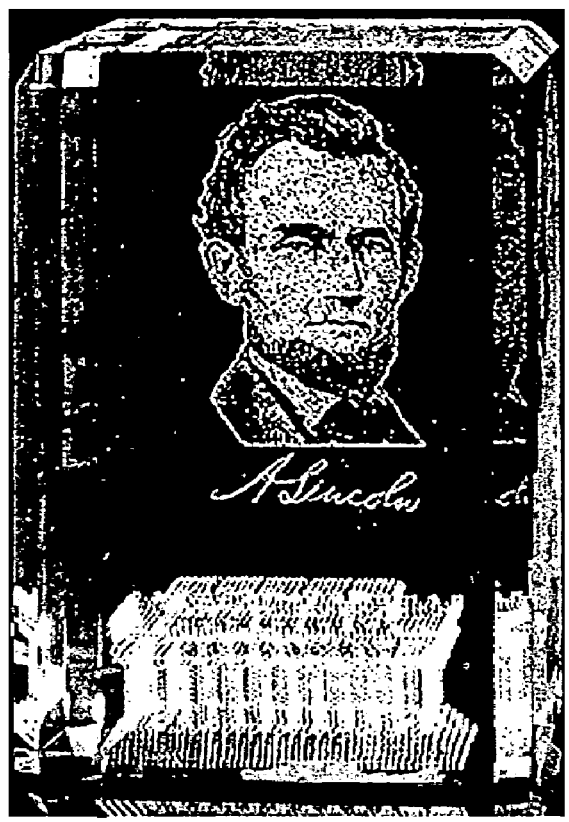
FIG. 2 illustrates examples of images produced with prior art techniques.
Figure 2:
Figure 2:

Comparing the images of FIGS. 11, 20 and 21 with the image of FIG. 2 it can be observed that the "sandwich" or layered portraits or images formed by multiple layers of images appear dramatically more realistic than ordinary one-layer portraits. The greater the number of layers which are used to generate the layered portrait, the greater the detail which can be achieved, in spite of limitations connected with minimum distance between adjacent etch points. It should be noted, however, that a considerable increase of number of layers can lead to the undesirable effect of the reproducible image appearing fuzzy. This is because the micro-destructions inside the material may have a relatively large size L (FIG. 6) along the direction of laser beam in relation to their dimensions in a plane perpendicular to the beam direction and the distance between layers of "sandwich" should be not less than this value.

It is an object of the invention to provide a method and apparatus for production of etch points or "micro-destructions" with size "L" as small as possible. Such an arrangement is desirable since it permits the layers forming the image to be placed closer together. As described above, the closer the layers are together, the less fuzzy the image will appear.

Figure 5:
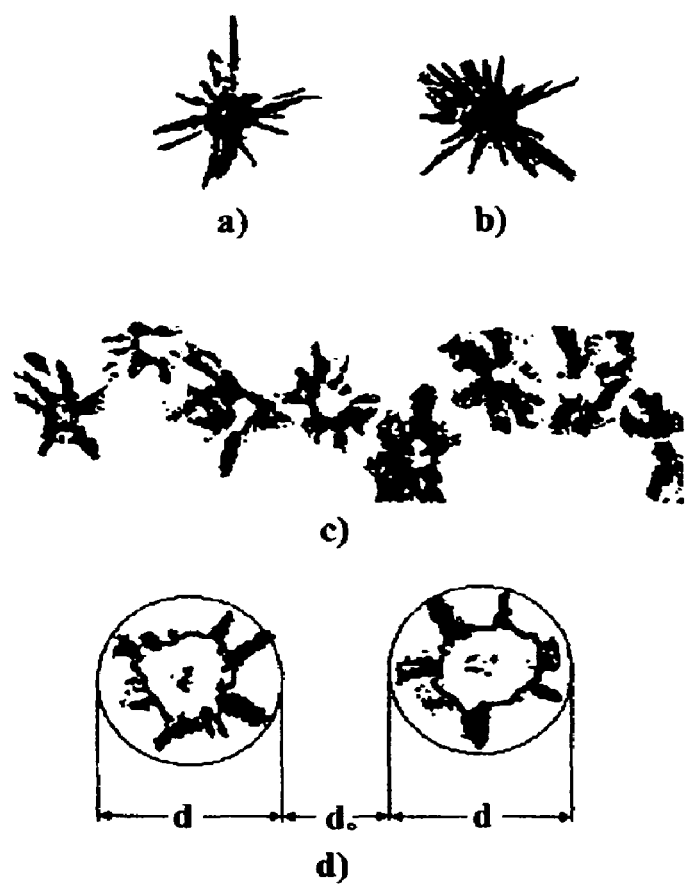
FIGS. 5(a)–(d) show examples of typical projections of etch points on plane XY, the projections perpendicular to a laser beam. The etch points were produced inside an optically polished, high-index lead oxide cut glass by Ultra-GRM Laser with pulse energy 0.8 mJ and their photos were made by a microscope camera with magnification of 100×.

Another embodiment of the invention is based on the physical phenomenon that the micro-destructions at pre-set points occur only if the power level of laser radiation at these points is greater than a threshold value E required to produce the breakdown (threshold phenomenon) and the observance that the size of micro-destruction in a direction parallel to the laser beam is much greater than in the plane perpendicular to the beam (see FIGS. 5 and 6).

Figure 25:
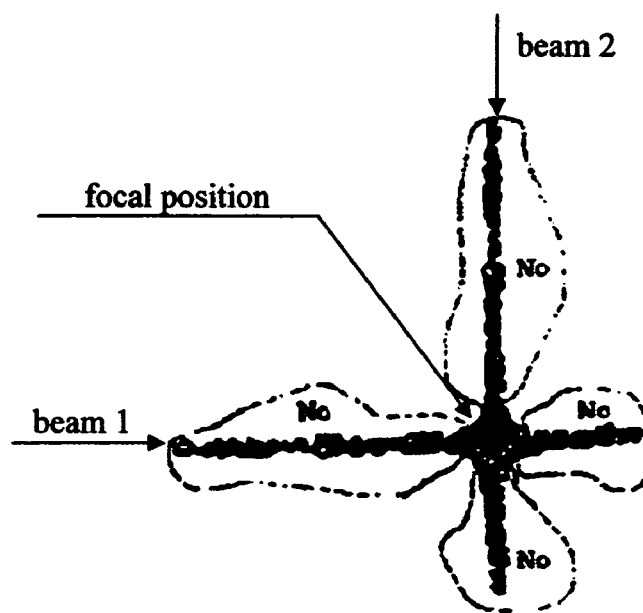
FIG. 25 is a schematic drawing of micro-damage formation when two laser beams are focused at the same point and power density of every of them is smaller than damage threshold value E but their sum is large than E.

If two laser beams are focused at a point and the radiation or power level of each one is lower than the threshold E but their sum power level is greater than E breakdown occurs in their cross area and the resultant micro-destruction is approximately equal in all 3 dimensions (see FIG. 25). As applied to the above-described methods of forming images, such causes (1) the size of the etch points in a direction parallel to the laser beam to be made smaller and (2) the brightness of the etch points to increase because their dimensions in all directions are approximately equalized.

Figure 26:
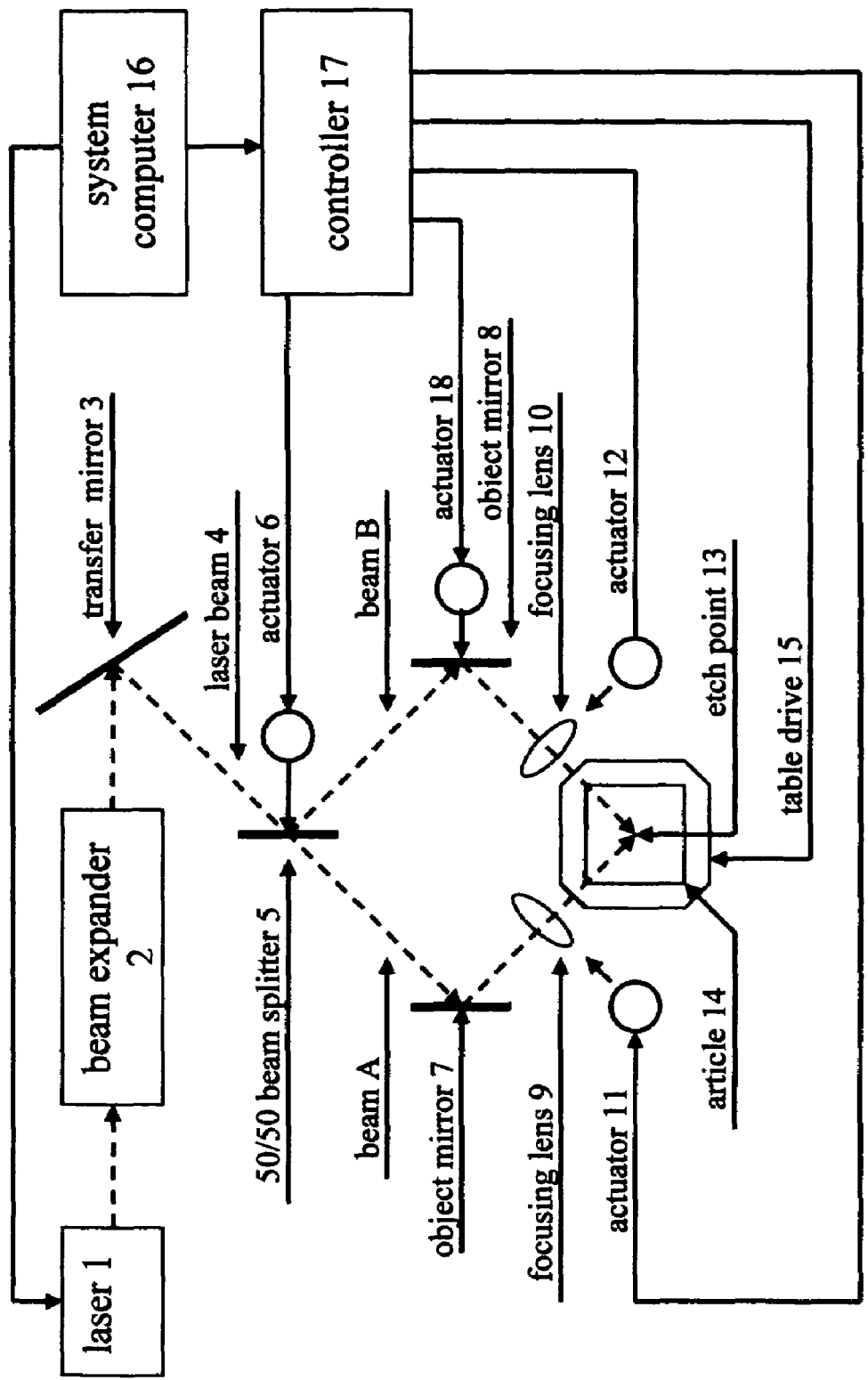
FIG. 26 is an exemplary block-diagram of a laser etching system that can reproduce a multi-layer portrait inside optically transparent material with a small distance between its layers.

Reference is now made to FIG. 26 which illustrates a block-diagram of a laser system in accordance with another embodiment of the invention. This system is adapted for reproducing an image in the interior of optically transparent material with etch points having dimensions approximately equal in all directions. In accordance with this system, a source 1 produces a beam 4 of laser radiation which after focusing the beam in the material of an article 14 has power density (for example, 1.1 E) which is slightly greater than the threshold level necessary to create breakdown in the material. Once emitted from the laser 1, the pulsed beam 4 passes through a beam expander 2 and to a transfer mirror 3 that directs the beam 4 to a 50/50 beamsplitter 5, which divides the laser beam into two separate beams A and B with equal energy.

Beam A is reflected by an object mirror 7 toward a convergent lens 9, which focuses the laser radiation to a select point 13 inside the article 14. Beam B is reflected by an object mirror 8 toward a focusing lens 10 which focuses the laser radiation into the same point 13 inside the article. The mirrors 7,8 direct beams A and B correspondingly so as they are incident upon the article from directions which are perpendicular to each other.

A table drive 15 is used to position the etch points along X,Y axes (coordinate system X,Y belongs to plane perpendicular to beam A, for example). The computer 16 supplied the table drive 15 with control signals to provide positioning. An actuator 11 is used to move the focal position of laser radiation along the beam A inside the article; by analogy with 11 an actuator 12 moves the focal position of laser radiation of beam B along the direction of the beam B. The computer 16, via the controller 17, supplies the actuator 11 and 12 with control signals to provide their positions with which focal positions of laser radiation of beams A and B coincide. An actuator 6 and an actuator 18 are used to move the beamsplitter 5 and the object mirror 8 so as beam path distances of beams A and B from the beamsplitter to the etch point 13 are equal. For this purpose the computer 16 supplies the actuators 6 and 18 corresponding control signals to satisfy to the expression:

$$d_A = d_B + \frac{h_B - h_A}{n}$$

where: $d_A$ is the beam path distance of beam A between the beamsplitter 5 and the surface of the article 14; $d_B$ is the beam path distance of beam B between the beamsplitter 5 and the surface of the article 14; $h_A$ is the distance along beam A from surface of the article to etch point 13; $h_B$ is the distance along beam B from surface of the article to etch point 13; and n is the refractive index of the material.

Using the aforementioned method together with the previously described methods of gray shades by pulse repetition, etch points with improved optical characteristics can be produced. Points having such small sizes can be placed closer to one another and as result there is no discernable point structure.

In accordance with one or more embodiments of the invention, a single layer portrait can be produced with a desirable resolution in accordance with the following steps:

Step E1: The true color portrait image with desirable space resolution is supplied to a computer, converted to 8-bit grayscale, and the number of the shades of gray in the image is reduced as much as possible while still maintaining a high quality basic image. The number of gray shades of the basic image after minimization is equal to M.

Step E2: The maximum dimension d for the etch points (based on the number of laser pulses at the same point) for generating these M gray shades is determined.

Step E3: The minimum distance $d_0$ between adjacent points with maximum dimensions which prevents an internal split or other undesirable damage to the material is determined.

Step E4: A magnification value for the computer images formed in step E1 is determined so that the number of pixels (which have a distance between them not less than $d_0$) of a new image is the same as in step E1. For example, if $d=d_0$ then the magnification is 400%; if $d=2d_0$ then the magnification is 900%.

Step E5: The image formed in step E1 is magnified in accordance with the value of step E4. This may be accomplished using commercial software (for example, by using the "Resample" procedure of the application Corel Photo-Paint).

Step E6: The image formed in step E5 is transferred to an image with M shades of gray, similar to the image formed in step E1. This may be accomplished with commercial software (for example, by using the "Posterize" procedure of the application Corel Photo-Paint).

Step E7: The plurality of etch points are formed from pixels of the image of step E6 so that the distance between adjacent etch points is equal to d. For instance, if $d=d_0$ and the magnification was 400%, then the plurality consists of points #1 of FIG. 7(a), but if $d=2d_0$ and the magnification was 900%, then the plurality consists of points #1 of FIG. 7(b).

Producing every etch point of the plurality of step E7 with the corresponding gray shade, determined by the image of step E6, a one layer portrait is reproduced with a resolution similar to the computer image of step E1.

All known methods of etch point production produce points which lack color. In general, the etch points have an appearance like incident light, being various shades of brightness between black and white. In accordance with one or more embodiments of the invention, a method is disclosed which permits the production of an etch point (micro-damage) which causes incident light (such as incandescent white light) to produce a iridescent light (i.e. light of many colors of the spectrum).

In accordance with yet another system and method of the invention, an etch point is created by two laser beams generated by dividing a laser beam. These divided beams converge at an angle, the value of which depends on desirable micro-damage area. Both beams are focused at the same point inside the article. The beam path of one beam is made equal to the other. As a result, the maximum intensity of both beams occurs at some spots and is minimized at others in a cross area of the beams (interference pattern). Laser induced damage occurs only if power level/density exceeds some threshold breakdown value E which varies for different materials. Using an original beam having sufficient intensity to exceed a threshold E only in very small spot, conditions are created in which damage or breakdown occurs at a very small area in the form of a separated plane, when considering a small internal diffraction grating.

Of course, if the areas where breakdown occurs are near one another it is often possible that an internal split or other undesirable damage can occur between them. In this case the structure of each etch point is a generally chaotic arrangement of separate planes, part of which form random glass prisms with random dimensions and random positions. Although the process of forming this etch point structure with two laser beams is chaotic, it can be controlled in some degree by changing the energy of the laser beam. In any event, whether the structure of etch point is dependent upon a chaotic diffraction grating or an arrangement of random prisms, the etch point expands white light incident upon it into color spectrum.

Figure 27:
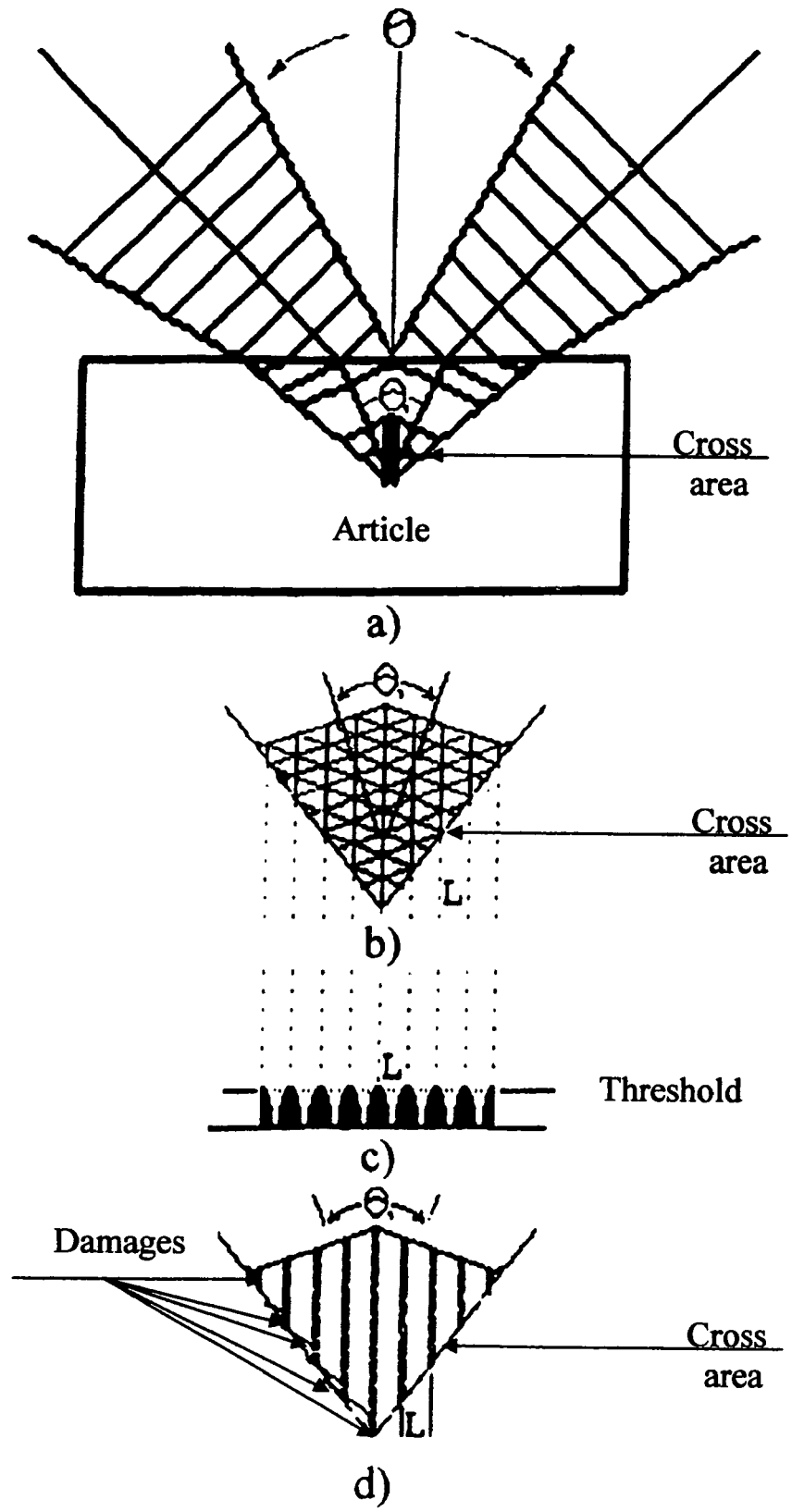
FIGS. 27(a)–(d) illustrate a method for producing iridescent etch points with two laser beams.

FIG. 27 shows a method for forming iridescent etch points. As illustrated in FIG. 27(a), two beam make an angle Θ and are focused at the same point inside an article. FIG. 27(b) illustrates an area where the beams cross. FIG. 27(c) shows an interference pattern of the beams and the value of laser induced damage threshold. FIG. 27(d) is a schematic illustrating fractures in the form of a grating structure in the focal area.

As illustrated in FIG. 27(a), two beams (such as divided beams) converge at an angle Θ, the value of which depends on the desirable micro-damage area. Both beams are focused at the same point inside the article. The beam path of one beam is arranged to be equal to the beam path (in length) of the other beam. The combined intensity of the beams fluctuates, being a maximum value at some points and a minimum at others within the area of intersection/interference. The distance "L" between adjacent areas of maximum energy is determined by the formula:

$$L = \lambda/(2\sin(\Theta/2));$$

where $\Theta$ is an angle between the beams inside the material and $\lambda$ is the wave length.

Laser induced damage occurs only if the power level density exceeds a threshold breakdown value E for the specific material. Using an original beam having sufficient intensity to exceed a threshold value E in a small spot S (see FIG. 27(c)), conditions are created in which damage or breakdown occurs at a very small area in the form of a separated plane (see FIG. 27(d)), when considering a small internal diffraction grating. Selecting the dimensions of an etch point (in the cross area of both beams), the desirable dimensions for S inside the etch point, and using the value E for the material and the above-referenced formula, it is possible to determine a coherent laser beam for producing an iridescent etch point.

Figure 28:
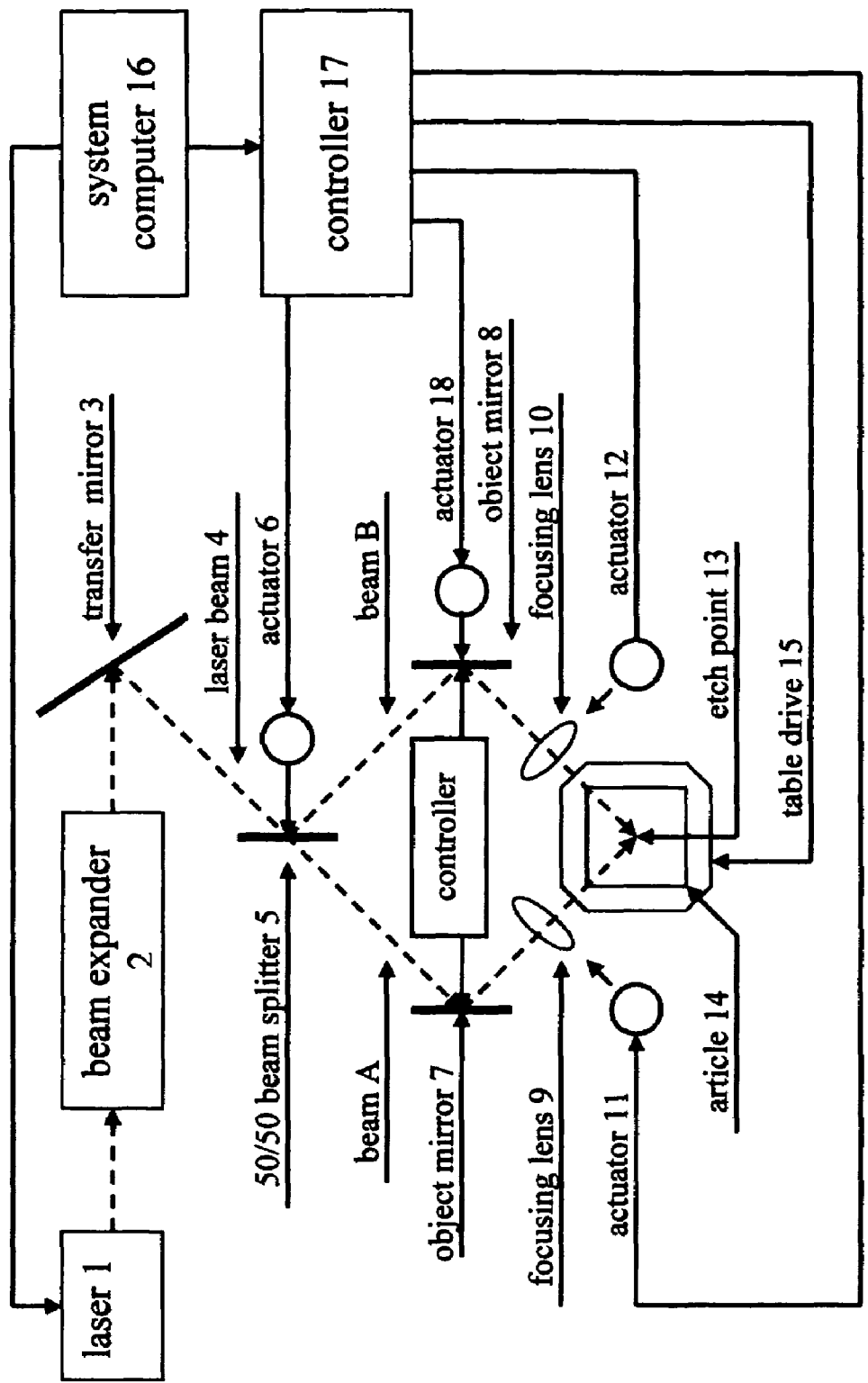
FIG. 28 is an exemplary block-diagram of a laser system for producing an image in the interior of optically transparent material with iridescent etch points in accordance with an embodiment of the invention.

One or more embodiments of the invention comprise a system and method for producing an image in the interior of optically transparent material with iridescent etch points. An embodiment of such a system is illustrated in FIG. 28. The block-diagram is very similar to FIG. 26 and differs from the last by the position of the article and by the angle between the beams, which in this case can be changed depending on the desired size of the etch points.

As one aspect of the invention, the arrangement illustrated in FIG. 26 or 28 may be combined with the arrangement illustrated in FIG. 1. In one such arrangement, two beams are directed generally perpendicular to one another at a focal point in a first object and two beams are directed generally perpendicular to one another at a focal point in a second object, whereby etch points having improved characteristics are generated simultaneously in the first and second objects. In another such arrangement, two beams are directed at an angle with respect to one another at a focal point in a first object and two beams are directed an angle with respect to one another at a focal point in a second object, whereby etch points having iridescent qualities are generated simultaneously in the first and second objects.

Another aspect of the invention is a method and system for generating a 3-D image inside optically transparent material based on unification of 3-D methods and the aforementioned methods for producing images/portraits so as to reproduce a portrait sculpture with a high resolution like the computer display image and without a visible sharp point structure. A method in accordance with such an embodiment of the invention a method comprises the steps of:

Step F1: Generate a multi-layer front portrait with auxiliary images perpendicular to the direction of the laser beam incident upon the article.

Step F2: Generate a plurality of contours comprising sections of the entire 3-D displayed image, i.e. a "skeleton" of the selected sculpture. The planes are perpendicular to the beam direction and parallel with respect to the surface of the optically transparent article. Image processing programs for cutting a 3-D image by multiple parallel planes are well known in the art. For example, the DataSculpt data processing software system may be used. A distance between the parallel planes is set to a minimum distance before which destruction (cracking etc.) of the material occurs.

Step F3: Each contour is projected onto the plane of the multi-layer front portrait.

Step F4: Pixels of the multi-layer front portrait which coincide with the contour projections are placed at points $p_1 \ldots p_n$ of the corresponding contours of the 3-D sculpture skeleton space.

Step F5: The remaining pixels of the multi-layer front portrait are placed into a section plane of the sculpture skeleton so as to retain the general rule of multi-layer portrait formation—pixels of the separate images belong in different planes.

Step F6: Generate a multi-layer profile portrait which is perpendicular to the front portrait.

Step F7: The contours of sculpture skeleton sections are projected onto the profile portrait plane, like straight lines.

Step F8: Pixels of the multi-layer profile portrait which belong to the straight lines are placed at points $P_1 \ldots P_m$ of the corresponding contours of the 3-D sculpture skeleton space.

Step F9: Every point from the plurality of points $P_1 \ldots P_m$ which coincides with one of the plurality $p_1 \ldots p_n$ and which has the same gray shade is produced by one etch point which serves both for the front and profile portraits. Every point from the plurality $P_1 \ldots P_m$ which coincides with one of the plurality $p_1 \ldots p_n$, but which has a gray shade closer to white than its corresponding point p is produced by two etch points, one with the same gray shade like the corresponding point of the plurality $p_1 \ldots p_n$ and another following after the first along the direction perpendicular to beam, providing the required additional brightness. Every point from the plurality $P_1 \ldots P_m$ which coincides with one of the plurality of points $p_1 \ldots p_n$ but which has a gray shade closer to black than its corresponding point p is produced by one etch point, but the corresponding point from the plurality $p_1 \ldots p_n$ is produced by two etch points—one with the same gray shade of the corresponding point of the plurality $P_1 \ldots P_m$ and another following after the first along the beam direction and having the required additional brightness.

Step F10: The remaining points comprising the multi-layer profile portrait are placed into the sculpture skeleton space so that the pixels of the separate auxiliary images are arranged in different planes and so that they do not result in additional points for the previously formed multi-layer front portrait. During this step the procedure of dividing one pixel point into two etch points analogous to step F9 is also possible.

As a result of these steps, a plurality of points is created both on the surface (as is usual for 3-D images) of the sculpture and inside it. This allows an increase in the number of etch points despite the restriction of the closeness for preventing possible internal split. At the same time, a 3-D sculpture is generated having a resolution nearly equal to that of the computer image and not having a discernable etch point structure.

The above-described method is advantageous over the prior art for the additional reason that the 3-D sculpture is generated portraits obtained from two different directions, with different sets of points corresponding to the different directions. This makes the sculpture more realistic than, for example, arrangements of the prior art where the sculpture is generated from one direction. For example, in one prior art arrangement, the single selected direction is chosen along an axis of symmetry. Such an arrangement does not permit individualized placement of points in multiple directions for generating a more realistic image, as in the above-described method.

As another aspect of the invention, it is desirable to offset points in adjacent planes of the portrait/sculpture when possible. If points in adjacent planes are placed in direct alignment along an axis Z perpendicular to the plane(s) in which the points lie, the distance between the adjacent planes must be "L" in order to prevent failure of the object. In such an arrangement, viewing of the image from the side (i.e. perpendicular to the "Z" axis) may result in a viewer seeing the separate planes of points. However, if points in adjacent planes are offset from one another in the Z direction, then the distance between adjacent planes can be substantially reduced while still maintaining the required separation distance "L" in the Z direction. In such a case, the planes can be placed so close to one another that the image appears contiguous and solid from all angles.

One or more aspects of the invention may be implemented as computer software or hardware of a computing system. For example, one or more of the steps A1–A7 may be implemented as computer software on computers 1 and/or 30 of the system illustrated in FIG. 1.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A system for producing an image inside an object which is viewable therethrough comprising:
    a basic image generator generating a basic image comprising at least two of gray shades;
    a sub-image generator generating a number of sub-images corresponding to the number of gray shades of comprising the basic image;
    an auxiliary image generator determining a number of auxiliary images from the sub-images, each auxiliary image comprising one or more points spaced apart by greater than a first minimum distance for which failure of the object may occur; and
    a laser beam emitting element for generating said auxiliary images in said object, each auxiliary image comprising one or more etch points positioned in a plane in said object and spaced by a distance no less than said first minimum distance, said etch points comprising an area of destruction in said object caused by laser light emitted by said element, said auxiliary images lying in parallel planes spaced apart by no less than a second minimum distance, said auxiliary images, when viewed in a direction generally perpendicular thereto forming a reproduction of said basic image.

2. The system in accordance with claim 1 including a beam splitter for splitting a laser beam emitted by said laser beam emitting element into a first beam and a second beam for simultaneously generating an image in two objects.

3. The system in accordance with claim 1 including a beam splitter for splitting a laser beam emitted by said laser beam emitting element into a first beam and a second beam, said first and second beams both used to generate one or more of said etch points.

4. The system in accordance with claim 1 including means for directing said first and second beams at an angle of convergence such that the resultant etch point has an iridescent appearance.

5. The system in accordance with claim 1 wherein said laser beam emitting element is arranged to emit a beam of a first energy for generating etch points associated with a first gray shade and a beam of a second energy for generating etch points associated with a second gray shade.

6. The system in accordance with claim 1 wherein said laser beam emitting element is arranged to emit multiple laser beam pulses at a point in said object for generating an etch point.

7. The system in accordance with claim 1 wherein said first and second minimum distances are dependent upon an energy of a beam emitted by said laser emitting element for generating an etch point in said material.

\* \* \* \* \*